(12) United States Patent
Smith et al.

(10) Patent No.: US 11,272,044 B2
(45) Date of Patent: Mar. 8, 2022

(54) CONCURRENT PROCESS EXECUTION

(71) Applicant: Miosoft Corporation, Madison, WI (US)

(72) Inventors: Todd Lyle Smith, Madison, WI (US); Mark D. A. van Gulik, Madison, WI (US)

(73) Assignee: Miosoft Corporation, Madison, WI (US)

( * ) Notice: Subject to any disclaimer, the term of this patent is extended or adjusted under 35 U.S.C. 154(b) by 0 days.

(21) Appl. No.: 16/738,241

(22) Filed: Jan. 9, 2020

(65) Prior Publication Data
US 2020/0153946 A1 May 14, 2020

Related U.S. Application Data

(60) Continuation of application No. 15/643,386, filed on Jul. 6, 2017, now abandoned, which is a division of
(Continued)

(51) Int. Cl.
| H04L 29/08 | (2006.01) |
| H04L 29/06 | (2006.01) |
| G06F 9/54 | (2006.01) |
| H04L 12/757 | (2013.01) |
| G06F 9/50 | (2006.01) |
| H04L 69/326 | (2022.01) |

(Continued)

(52) U.S. Cl.
CPC ............ *H04L 69/326* (2013.01); *G06F 9/542* (2013.01); *G06F 9/546* (2013.01); *H04L 69/161* (2013.01); *H04L 69/165* (2013.01); *G06F 9/5027* (2013.01); *G06F 2209/5015* (2013.01); *G06F 2209/5018* (2013.01); *G06F 2209/544* (2013.01); *G06F 2209/548* (2013.01); *H04L 45/023* (2013.01)

(58) Field of Classification Search
CPC ... H04L 67/2823; H04L 67/10; H04L 67/141; H04L 69/326; H04L 69/161; H04L 65/103
See application file for complete search history.

(56) References Cited

U.S. PATENT DOCUMENTS

| 5,881,243 A | 3/1999 | Zaumen et al. |
| 6,061,713 A * | 5/2000 | Bharadhwaj ............... G06F 9/54 |
| | | 709/203 |

(Continued)

FOREIGN PATENT DOCUMENTS

| CN | 101491033 A | 7/2009 |
| EP | 2 007 065 | 12/2008 |

(Continued)

OTHER PUBLICATIONS

U.S. Appl. No. 13/353,381, filed Jan. 19, 2012.
(Continued)

*Primary Examiner* — El Hadji M Sall
(74) *Attorney, Agent, or Firm* — Fish & Richardson P.C.

(57) ABSTRACT

Among other things, a node is enabled to participate, with other nodes, in forming and using transport layer features in a communication network, the transport layer features being extensible to support ten million or more simultaneous reliable conversations between or among applications running on respective participant nodes.

8 Claims, 12 Drawing Sheets

Related U.S. Application Data application No. 13/353,381, filed on Jan. 19, 2012, now Pat. No. 9,769,292.

(51) Int. Cl.
*H04L 69/16* (2022.01)
*H04L 69/165* (2022.01)
*H04L 45/023* (2022.01)

(56) References Cited

U.S. PATENT DOCUMENTS

| | | | |
|---|---|---|---|
| 6,061,807 A | 5/2000 | Albert et al. | |
| 6,269,378 B1 | 7/2001 | Quirt | |
| 7,072,329 B2 | 7/2006 | Willars et al. | |
| 7,304,982 B2 | 12/2007 | Hondo et al. | |
| 7,318,102 B1 | 1/2008 | Krause et al. | |
| 7,551,629 B2 | 6/2009 | Chen et al. | |
| 8,082,468 B1 | 12/2011 | Backensto et al. | |
| 8,478,890 B2 | 7/2013 | Chaturvedi et al. | |
| 9,769,292 B2 | 9/2017 | Smith et al. | |
| 2003/0106067 A1 | 6/2003 | Hoskins et al. | |
| 2005/0071440 A1* | 3/2005 | Jones | H04L 12/1827 709/218 |
| 2005/0149934 A1 | 7/2005 | Doolittle et al. | |
| 2006/0020525 A1* | 1/2006 | Borelli | G06Q 30/0641 705/34 |
| 2006/0123079 A1 | 6/2006 | Sturniolo et al. | |
| 2007/0291765 A1 | 12/2007 | Boley et al. | |
| 2008/0049619 A1* | 2/2008 | Twiss | H04L 69/329 370/236 |
| 2008/0062862 A1 | 3/2008 | Goyal et al. | |
| 2008/0077710 A1 | 3/2008 | Kouvelas et al. | |
| 2008/0205415 A1* | 8/2008 | Morales | H04L 67/16 370/401 |
| 2008/0209434 A1 | 8/2008 | Queck et al. | |
| 2008/0263172 A1 | 10/2008 | Hickerson et al. | |
| 2008/0263212 A1 | 10/2008 | Goix et al. | |
| 2009/0299957 A1 | 12/2009 | Ledlie | |
| 2010/0057835 A1 | 3/2010 | Little | |
| 2010/0085887 A1 | 4/2010 | Ray et al. | |
| 2010/0198698 A1* | 8/2010 | Raleigh | H04L 41/0806 705/26.1 |
| 2010/0250755 A1 | 9/2010 | Morris | |
| 2010/0322236 A1 | 12/2010 | Vimpari et al. | |
| 2012/0303609 A1 | 11/2012 | Bent et al. | |
| 2013/0124475 A1 | 5/2013 | Hildenbrand et al. | |
| 2013/0191434 A1 | 7/2013 | Smith et al. | |
| 2014/0280398 A1 | 9/2014 | Smith et al. | |
| 2017/0310794 A1 | 10/2017 | Smith et al. | |

FOREIGN PATENT DOCUMENTS

| | | |
|---|---|---|
| EP | 2 057 803 | 1/2011 |
| EP | 2805459 | 11/2014 |
| WO | WO 2004/051497 | 6/2004 |
| WO | WO 2013/109455 | 7/2013 |
| WO | WO 2014/150378 | 9/2014 |

OTHER PUBLICATIONS

U.S. Appl. No. 13/838,518, filed Mar. 15, 2013.
Chinese Office Action with English translation issued in Chinese application 201380014967.9 dated Sep. 12, 2016 (14 pages).
European Communication pursuant Pursuant to Rules 161 & 162 EPC dated Aug. 27, 2014 issued in European application 13738594.4 (3 pages).
European Communication pursuant to Article 94(3) EPC dated Nov. 2, 2015 issued in European application 13738594.4 (8 pages).
European Office Action for App. Ser. No. EP 13 73 8594, dated Nov. 2, 2015, 8 pages.
European Search Report for App. Ser. No. EP 13 73 8594, dated Oct. 13, 2015, 6 pages.
International Preliminary Report on Patentability for App. Ser. No. PCT/US14/23097, dated Sep. 15, 2015, 7 pages.
International Preliminary Report on Patentability for App. Ser. No. PCT/US2013/020964, dated Jul. 22, 2014, 9 pages.
International Preliminary Report on Patentability from PCT application PCT/US2014/023097 dated Sep. 24, 2015 (7 pages).
International Search Report and Written Opinion for App. Ser. No. PCT/US14/23097, dated Aug. 22, 2014, 14 pages.
International Search Report and Written Opinion for App. Ser. No. PCT/US2013/020964, dated May 7, 2013, 15 pages.
Özsu and Valduriez, "Principles of Distributed Database Systems," p. 3, Third Edition, copyright Springer Science + Business Media, LLC (2011).
Response to European Communication pursuant Pursuant to Rules 161 & 162 EPC issued in European application 13738594.4, submitted on Feb. 12, 2015 (9 pages).
Response to Supplemental Search Report issued in European application 13738594.4, submitted on Aug. 4, 2015 (4 pages).
Supplemental Partial European Search Report for App. Ser. No. EP 13 73 8594, dated Jun. 30, 2015, 6 pages.
Tanenbaum, A., Computer Networks, "The Transport Layer," Computer Networks, Third Edition, Prentice-Hall International, London, GB, pp. 479-576, Jan. 1, 1996, XP002348041, ISBN: 978-0-13-394248-4.
U.S. Appl. No. 13/353,381, filed Jan. 19, 2012—Issued U.S. Pat. No. 9,769,292.
U.S. Appl. No. 15/643,386, filed Jul. 6, 2017—Published 20170310794.
U.S. Appl. No. 13/838,518, filed Mar. 15, 2013—Abandoned.

\* cited by examiner

CONCURRENT PROCESS EXECUTION

CROSS REFERENCE

This application is a continuation of U.S. application Ser. No. 15/643,386, filed Jul. 6, 2017, which is a division of U.S. application Ser. No. 13/353,381, filed Jan. 19, 2012. The entire contents of all above references are incorporated herein by reference.

BACKGROUND

This description relates to concurrent process execution.

Referring to FIG. 1, multiple processes 10 (also called applications or programs) can be run, for example, by corresponding processors 12 (e.g., computers) that are located at different nodes 14 of a network 16. The concurrent execution can be managed by the processes sending and receiving network data packets 18 that conform to, for example, the Transmission Control Protocol (TCP). Correct delivery of the TCP data packets is facilitated by identifying, in each packet, source and destination addresses 20, 22 on the network of the nodes at which the data packet is being sent and received, and source and destination port numbers 24, 26 at the sending and receiving nodes that have been reserved by the sending and receiving processes for the connection on which the data packets are to be carried. The TCP permits a limited number of ports to be reserved at a given node by providing a 16-bit addressable port space (0-65535).

SUMMARY

In general, in an aspect, a node is enabled to participate, with other nodes, in forming and using transport layer features in a communication network, the transport layer features being extensible to support ten million or more simultaneous reliable conversations between or among applications running on respective participant nodes.

Implementations may include one or more of the following features. The conversations are reliable based on at least one of the following: delivering notifications reliably and delivering data streams reliably by delivering datagrams unreliably and applying a process to the unreliable datagram delivery to assure the reliability of the stream delivery. The node is enabled to participate without regard to the platform on which the node is running. The transport layer features are provided at the application level of the communication network. The participating node and other participating nodes are organized automatically to provide the extensible transport layer features. The conversations are reliable based on at least one of (a) delivering notifications reliably or (b) delivering data streams reliably by delivering datagrams unreliably and applying a process to the unreliable datagram delivery to assure the reliability of the stream delivery.

In general, in an aspect, user applications that run in an application layer on nodes of a communication network are enabled to cooperate to implement network transport layer features on the communication network and to use the implemented network transport layer features.

Implementations may include one or more of the following features. The transport layer features include TCP features. The TCP features are used to carry notifications reliably. The transport layer features include UDP features. The UDP features are used for autodiscovery of nodes and automatic organization of node topology.

In general, in an aspect, nodes of a small communication network are enabled to form and participate in transport layer features that provide as many as trillions of communication channels available for communication among applications hosted on the nodes.

Implementations may include one or more of the following features. The small communication network includes fewer than all of the nodes on the Internet. Each of the communication channels includes two communication endpoints each represented by a persistent service handle. The service handle is maintained by a node that hosts an application that provides or uses an associated service through one of the communication channels. The forming of the transport layer features by the nodes includes managing service handles associated with endpoints of the communication channels. The nodes cooperate to maintain a common global view of existing service handles. The network transport features include TCP features. The network transport features include UDP features.

In general, in an aspect, as a configuration of a communication network changes, tables are dynamically determined, at nodes of the network, to be used for routing communications from node to node through the network. The dynamic determining includes propagating neighborhood snapshots generated at respective nodes and in response to the propagated neighborhood snapshots, iteratively delaying the determining of routing tables.

Implementations may include one or more of the following features. A node schedules, for an incrementally later time, a rebuilding of its routing table when another node joins or leaves its neighborhood. The node reschedules, for a yet incrementally later time, a rebuilding of its routing table when yet another node joins or leaves its neighborhood.

In general, in an aspect, at a node in a communication network, a service location facility is provided for applications hosted on the node with respect to services offered or used by the applications hosted on the node or by applications hosted on other nodes of the communication network. The service location facility maintains associations between services and corresponding service identifiers.

Implementations may include one or more of the following features. Snapshots of the associations are propagated from the node to other nodes in the network. The associations are maintained in a service catalog. Alternate modes are provided for an application to use the service catalog to locate services of interest. The associations are used to provide anycast features. The associations are used to provide multicast features. The associations are used to provide load-balancing features with respect to use of the communication network. The associations are used to provide proximity routing features.

In general, in an aspect, in a node of a communication network, maintenance of communication endpoints is enabled for use in establishing conversations of the nodes and of the applications of the network. The endpoints are maintained persistently as one or more of the following occur: (a) conversations are established and terminated, (b) network transport software instances are shut down and restarted, (c) nodes on which network transport software instances are running are shut down and restarted, (d) an entire network transport layer mesh is shut down and restarted, or (e) the entire communication network is shut down and restarted.

Implementations may include one or more of the following features. Security techniques are applied based on the persistence of the endpoints. Maintaining the endpoints persistently includes maintaining associated service handles persistently. Statistically unique global identity of the service handles is maintained. Service handles are enabled to be reused by transport software instances to represent given participants of a conversation. Applications on nodes of the communication network are enabled to provide and use services between them privately based on the persistence of the endpoints. Applications are enabled to migrate from one node to another node of the network and the migrated applications are enabled to provide and use services to one another based on the persistence of the endpoints. Static program correctness is analyzed based on the persistence of the endpoints. Conversations of the nodes are re-established after a failure of the communication network based on the persistence of the endpoints.

In general, in an aspect, in a communication network in which applications hosted on nodes of the network provide and use services through communication between nodes on the network, nodes of the network are enabled to cooperate to provide reliable notification when failures at a node affect the availability of services from applications hosted on the node.

Implementations may include one or more of the following features. The failures include software restarts. The failures include hardware resets. The nodes of the network are enabled to cooperate to provide reliable notification by using transport layer software instances running on the nodes. The failures include loss of operation of one or more of the instances. The nodes include operating systems software running on hardware. The failures include loss of operation of the operating system, the hardware, or both.

In general, in an aspect, in a communication network, applications hosted on a node of the network are enabled to publish the availability of services provided by the applications and to subscribe to services offered by other applications. The publication includes publishing in one mode when a service is subscribed by an application that is hosted on the same node as the application that publishes the service, and publishing in a different mode when a service is subscribed by an application that is hosted on a different node from the node hosting the application that publishes the service.

Implementations may include one or more of the following features. The published service availability is used to respond to a request by an application for the location of the service. The application requesting the location need have no a priori knowledge of whether the service is available on a local node or on a remote node. The application uses a single location-neutral interface for requesting the location whether the service is available on a local node or on a remote node.

In general, in an aspect, in a communication network, applications hosted on a node of the network are enabled to subscribe to services published by applications on the network. The subscribing includes: subscribing in one mode when a service is published by an application that is hosted on the same node as the application that subscribes to the service, and subscribing in a different mode when a service is published by an application that is hosted on a different node from the node hosting the application that subscribes to the service.

Implementations may include one or more of the following features. In the different mode, the subscribing is registered locally by transport layer software running on the same node as the application that subscribes to the service. If any subscriptions have already been registered at the same node for the service published by the application hosted on the different node, the local node need not report the new subscriber to the remote publishing application.

In general, in an aspect, when a first client application hosted by a local node of a network wants to subscribe to a service offered by a service application running on a remote node, a local transport layer software instance on the local node sends a subscription management message to the remote node to subscribe to the service on behalf of the first client application. The local transport layer software instance enables other local applications to use the service without requiring any other subscription management message to be sent on the network to the other node.

Implementations may include one or more of the following features. The local transport layer software instance sends another subscription management message only when no local client application any longer uses the service. A request for the location of a service is responded to in a way that depends on whether the service being sought by an application is hosted on the same node as the application that provides the service. The responding can be based on only services published in the one mode, or on services published in the one mode and in the different mode.

In general, in an aspect, communication by applications hosted on nodes of a communication network is enabled by a combination of notifications that are delivered reliably and datagrams that are delivered unreliably.

Implementations may include one or more of the following features. The enabled communication is used to reliably deliver streamed data. The datagrams are used to deliver user data.

In general, in an aspect, in a communication network, each of the nodes of the network (a) can engage in communications, on behalf of applications hosted on the node, with other nodes in the network and (b) provides an I/O system for physical delivery and receipt of the communications. The communications are in contention for use of the I/O system. Entirely deadlock-free asynchronous operation of the I/O system is provided with respect to contending communications. These and other aspects, features, and implementations can be expressed as methods, systems, apparatus, program products, methods of doing business, means and steps for performing functions, components, and in other ways.

Other features, objects, and advantages of the invention will be apparent from the description and drawings, and from the claims.

DESCRIPTION

Although the 16-bit addressable port space provided by the TCP is enough for many user applications and network communication among them, it often is too small for supercomputing clusters and grids. For example, the limited port space may make it impossible to implement direct TCP packet communication among interconnected cliques of thousands of participant processes that are to execute large-scale parallel algorithms.

Although the TCP imposes upon its connections (i.e., on its connection space) only the uniqueness constraint of <source IP, source port, destination IP, destination port>, sometimes the connection space cannot be fully allocated under the specification of the Berkeley Software Distribution (BSD)-derived socket application programming interfaces (APIs). In particular, the APIs require a client process to allocate a unique local TCP port before initiating a connection to a server, and the client's node is limited, by the port space, to $2^{16}$ (65536) outgoing TCP connections. Similarly, a node that hosts a server process is limited to $2^{16}$ incoming connections from a particular node of a client.

The TCP on Internet Protocol version 6 (IPv6) deals with these scale limitations by vastly expanding the network source and destination address space (rather than an expanded port space), but aspects of typical implementations of IPv6 constrain the degree of parallelism available for grid computing applications, particularly in systems in which distributed software is making effective use of the processor cores available at a particular node.

As an example, given a grid application distributed across 120 nodes, each of which hosts one process for each of its 24 processor cores, such that every process wishes to communicate with every other participating process uniformly using the TCP, each node would need to dedicate 69,096 ports for the local use of the grid application processes running on that node. This number of ports is several thousand more than could be supported by the TCP port space.

Here we discuss a new platform-neutral network transport layer that provides connection space opportunities that scale significantly beyond the TCP 16-bit port space limitation. This new transport layer also provides deep, efficient network buffering and a robust service architecture that supports anycast and multicast addressing, load balancing, persistence of identity, and reliable notification of events. Tens of millions of active communication endpoints distributed across thousands of applications and hundreds of nodes can be managed using available processors, memories, and other hardware, without imposing special hardware requirements. A high level of parallelism can be provided for grid computing applications, particularly in cases when distributed software is making good use of processor cores available at a particular node.

Figure 2:
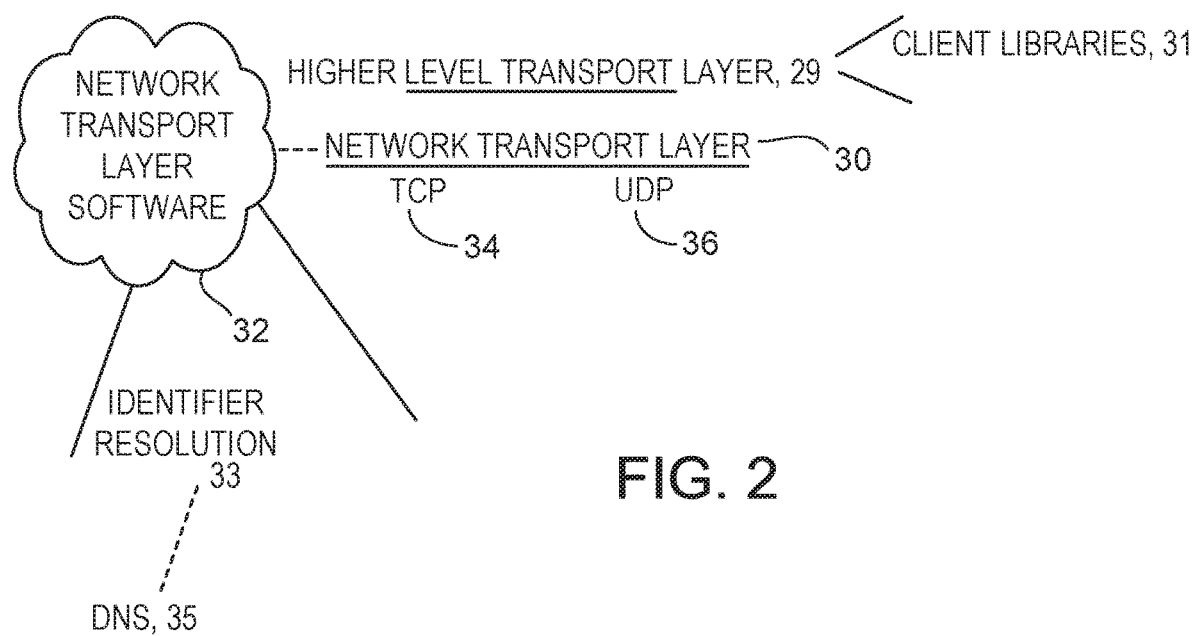

As shown in FIG. 2, in some examples, this platform-neutral, large connection space network transport layer 30 can be implemented as what we will call network transport software 32, instances of which run at respective nodes of the network. We use the phrase network transport software in a very broad sense to include, for example, instances of software that run on nodes of networks and provide any one or more, or any combination, of the novel features described here. Some implementations of the network transport software can be in the form of instances of Mioplexer™ software, available from MioSoft Corporation of Madison, Wis., USA. Any references to Mioplexer in this description are meant to be broad references to any kind of such network transport software including the kinds described in this document.

The network transport software operates above the TCP 34 and User Datagram Protocol (UDP) 36 as a higher-level network transport layer 29. In some implementations, the network transport software supports Internet Protocol versions 4 (IPv4) and 6 (IPv6).

Figure 3:
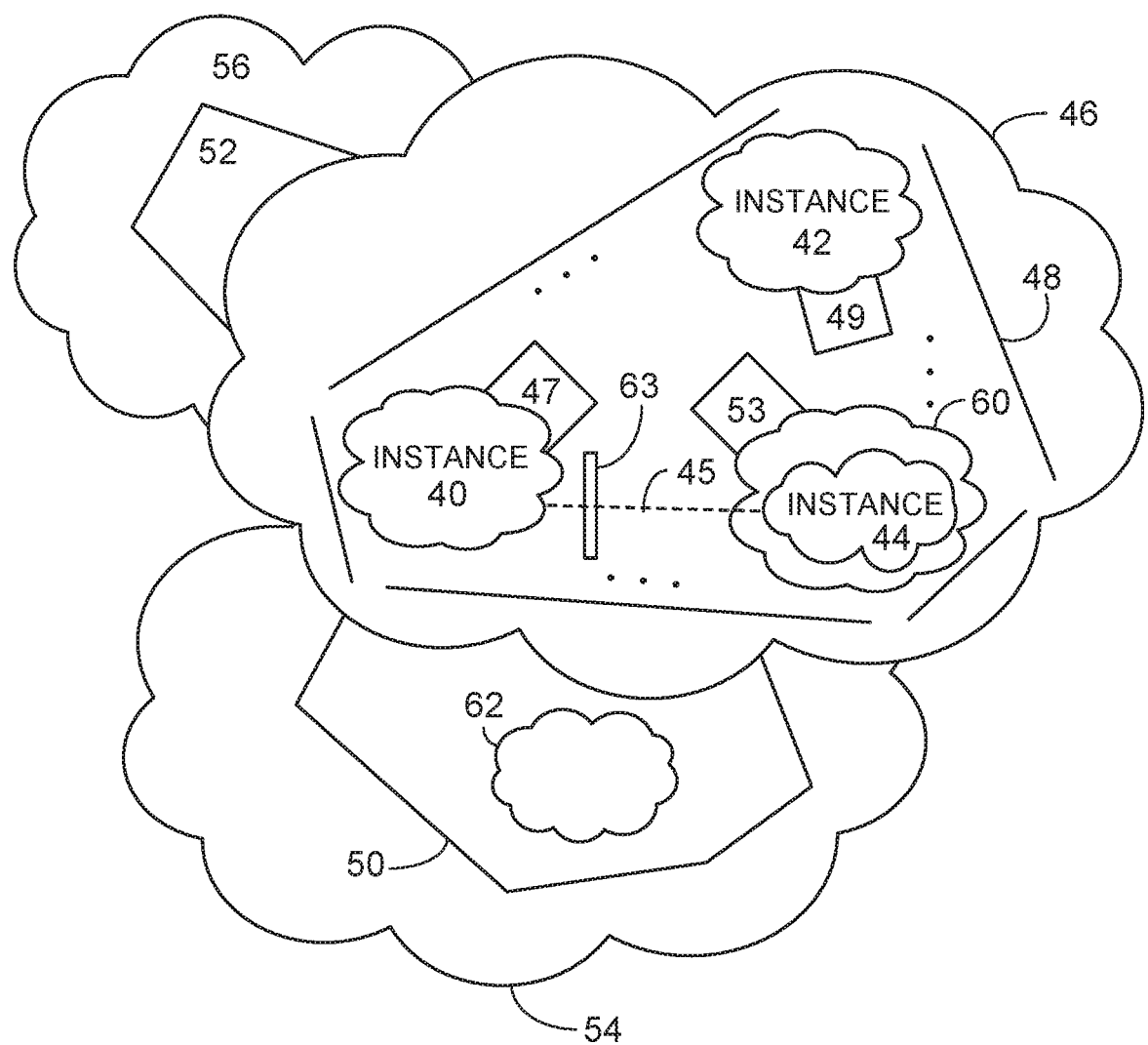

As shown in FIG. 3, a network transport software instance 40 uses broadcast addressing to autodiscover other instances 42, 44 operating on the same network 46, to form a large-connection-space network transport mesh 48 of nodes for that network. The autodiscovery process shares network transport software identifiers that specify TCP listen ports for autodiscovery purposes. The network transport software 32 includes an identifier resolution process 33 that uses the Domain Name System (DNS) 35 to resolve nonnumeric identifiers while treating conformant decimal and hexadecimal numeric identifiers as IPv4 and IPv6 addresses, respectively.

If broadcast addressing is unavailable or insufficient, the autodiscovery process may be supplemented by unicast addressing of preconfigured targets. This mechanism may also be used to join together large-connection-space network transport meshes 50, 52 associated with different networks 54, 56. In some implementations, the network transport software can be implemented on commercially available commodity hardware that incorporates a Network Interface Card (NIC), and runs on any operating system that supports a Java platform.

As shown in FIG. 3, an interconnected mesh 48 formed by the network transport software includes a collection of instances 40, 42, 44 of the network transport software that is distributed across many network nodes 60, 62 in each network 46, 54, 56 of a network, such as a TCP/IP network. In a typical configuration, each participating node hosts only a single instance of the network transport software. (Sometimes, we refer to a node in a network that hosts an instance of the network transport software simply as a node. Sometimes we use the terms node and network transport software interchangeably. Note that, although the node hosts the network transport software, the software may be off while the node is running. And, when the node is down, the software is also down.)

This configuration is analogous to a typical configuration of a traditional network transport layer: an operating system instance at a node provides a single implementation of a TCP stack to be shared by all user applications. In some implementations of what we describe here, a single node in a network can host multiple copies of network transport software, which can be used for locally testing the base software and user applications.

Figure 1:
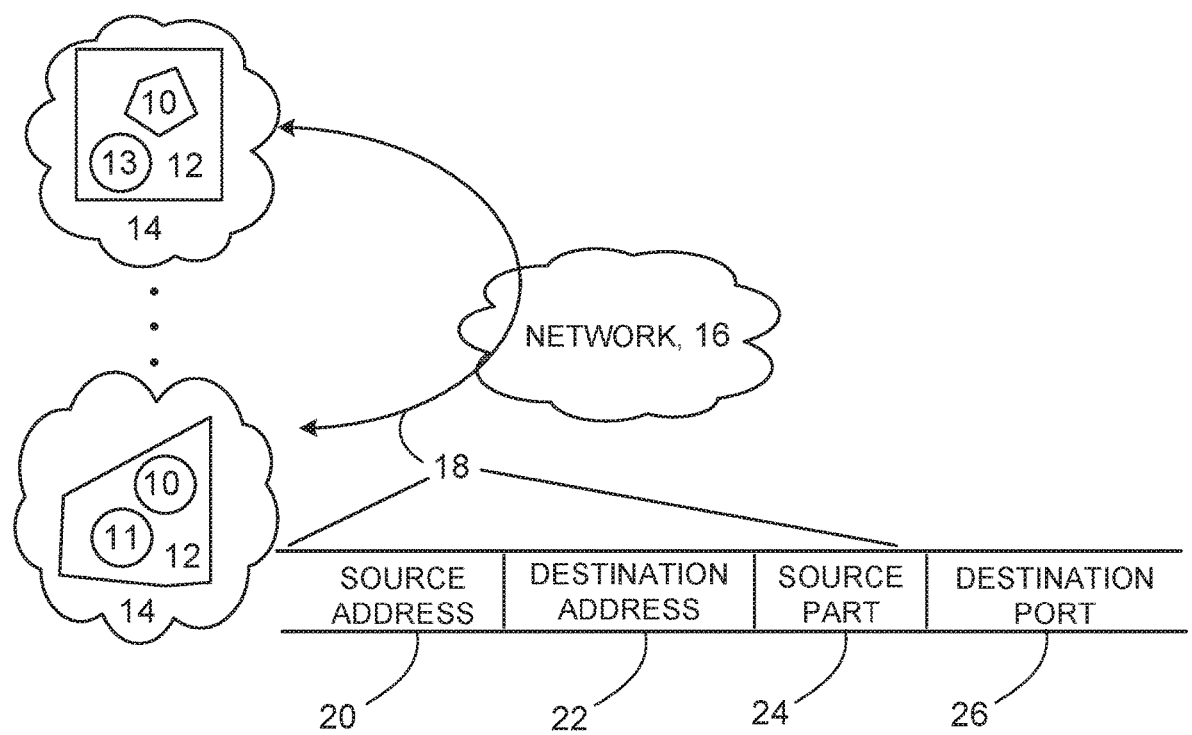
FIGS. 1 through 12 are block diagrams of combinations of elements associated with concurrent process execution.

The network transport software instances running in the nodes use a UDP-based autodiscovery process to organize themselves into the interconnected mesh. In a reasonably stable network environment, user applications 11, 13 (FIG. 1) running on the various nodes of the mesh can automatically leverage the pre-established mesh to reduce startup latency that would otherwise be needed for initiating concurrent parallel processing of distributed algorithms.

Neighboring nodes within a mesh are reliably connected using the TCP. A network transport software instance uses the same port number, by default 13697, for new TCP connections as for incoming and outgoing UDP autodiscovery-related messages. The autodiscovery process remains active throughout the lifetime of the network transport software, and thus automates fast recovery of lost TCP connections that result from temporary network disruptions. Provided that network links do not disappear as a result of topological reorganization, then the autodiscovery mechanism automatically repairs long-term breaches in the mesh.

The network transport software instances 40, 42, 44 (we sometimes will refer to instances of the network transport software simply as network transport software, for simplicity) hosted on different nodes can connect to each other using full-duplex TCP connections 45. Once a TCP connection has been established between two network transport software instances (we sometimes refer to these connections between instances of the transport software as network transport software connections), the client node and server node, in client-server model examples, negotiate to agree upon, for example, a Mioplexer protocol version. If no consensus can be reached, the client must disconnect from the server. Should the client fail to disconnect in this event, then the server must disconnect the client upon incidence of the first protocol violation.

Figure 4:
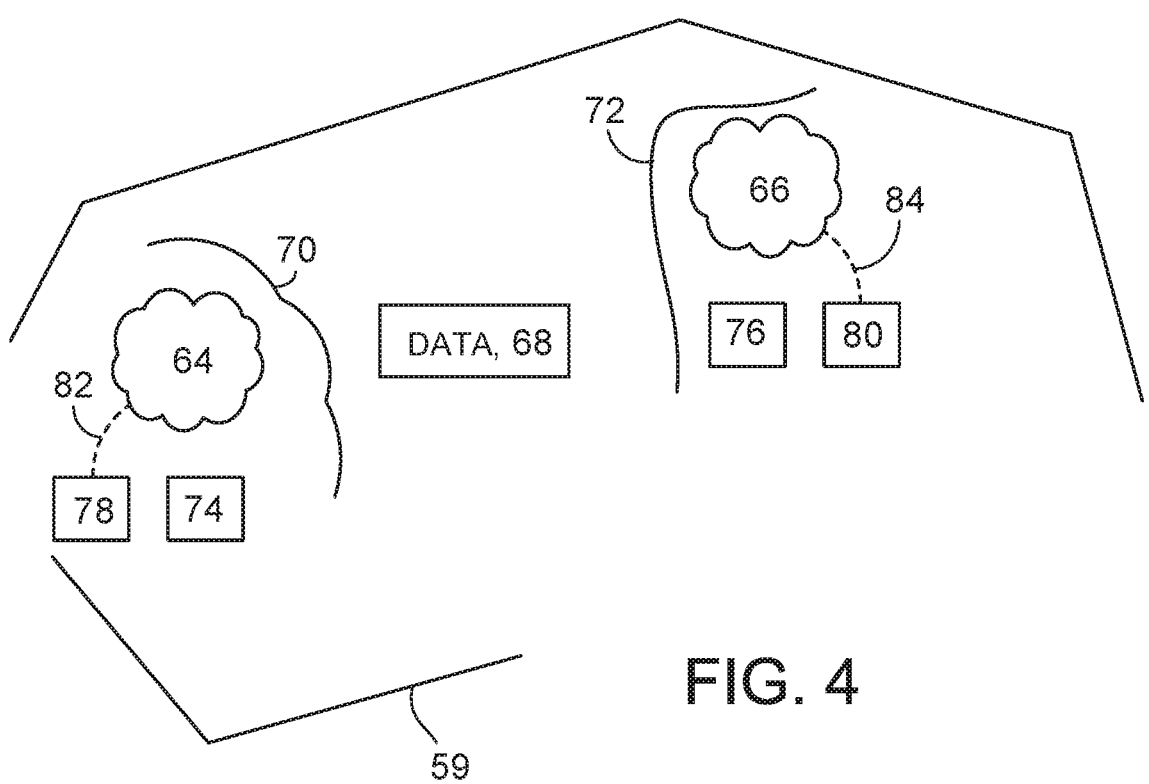

Referring to FIG. 4, the mesh 59 supports user applications 64, 66 that wish to interchange data 68 between disjoint address spaces or network nodes 70, 72, to provide or use nonlocal services 74, 76, or collaborate to execute parallel algorithms, or any combination of two of more of those activities, and others.

A user application that wishes to use a mesh for any of these activities first establishes a TCP connection 82, 84 to a specific network transport software instance 78, 80 within the mesh. Though a user application may elect to participate in the network transport software autodiscovery process to locate a suitable target instance, the user application often will have prior knowledge of a specific network transport software instance and its hosting node's identity and location. Often, the target instance will be running on the same node as the user application.

We refer to a TCP connection between a network transport software instance and a user application as an application connection. When the user application is behaving as a client relative to a service provided by the network transport software instance, the application connection can be called a client connection. With respect to the roles played by network transport software instances and applications, any network transport software instance can act as a server for a client application that is looking for service. And a network transport software instance can act as a client when looking to set up an outgoing connection to another node. A user application can be a client if it needs service, either from another user application or from a node, or a server to provide a service to another user application. In all of these cases, a client needs a service and the server provides it.

There are two levels of logical connectivity among instances and applications. The lower level is TCP connectivity between a user application and a network transport software instance. The higher level is service handle (e.g., channel) connectivity between two user applications. A logical connection usually establishes the directionality of the client-server relationship. Both user applications and network transport software instances can perform either role (client or server) depending upon context.

In some implementations, application connections are treated as full-duplex for all purposes. After an application connection is established, the user application and the network transport software negotiate to agree upon, for example, a Mioplexer protocol version. If no consensus can be reached, the user application will disconnect from the network transport software. Should the client fail to disconnect in this event, then the network transport software will disconnect the user application upon incidence of the first protocol violation. If, on the other hand, protocol version negotiation results in a viable application connection, a user application operating say as a client can send control messages, queries, and datagrams along this connection and can receive control message acknowledgments, query responses, datagrams, and event notifications from the network transport software or other user applications along the same connection. The client datagrams can carry user data from one user application to another.

Figure 5:
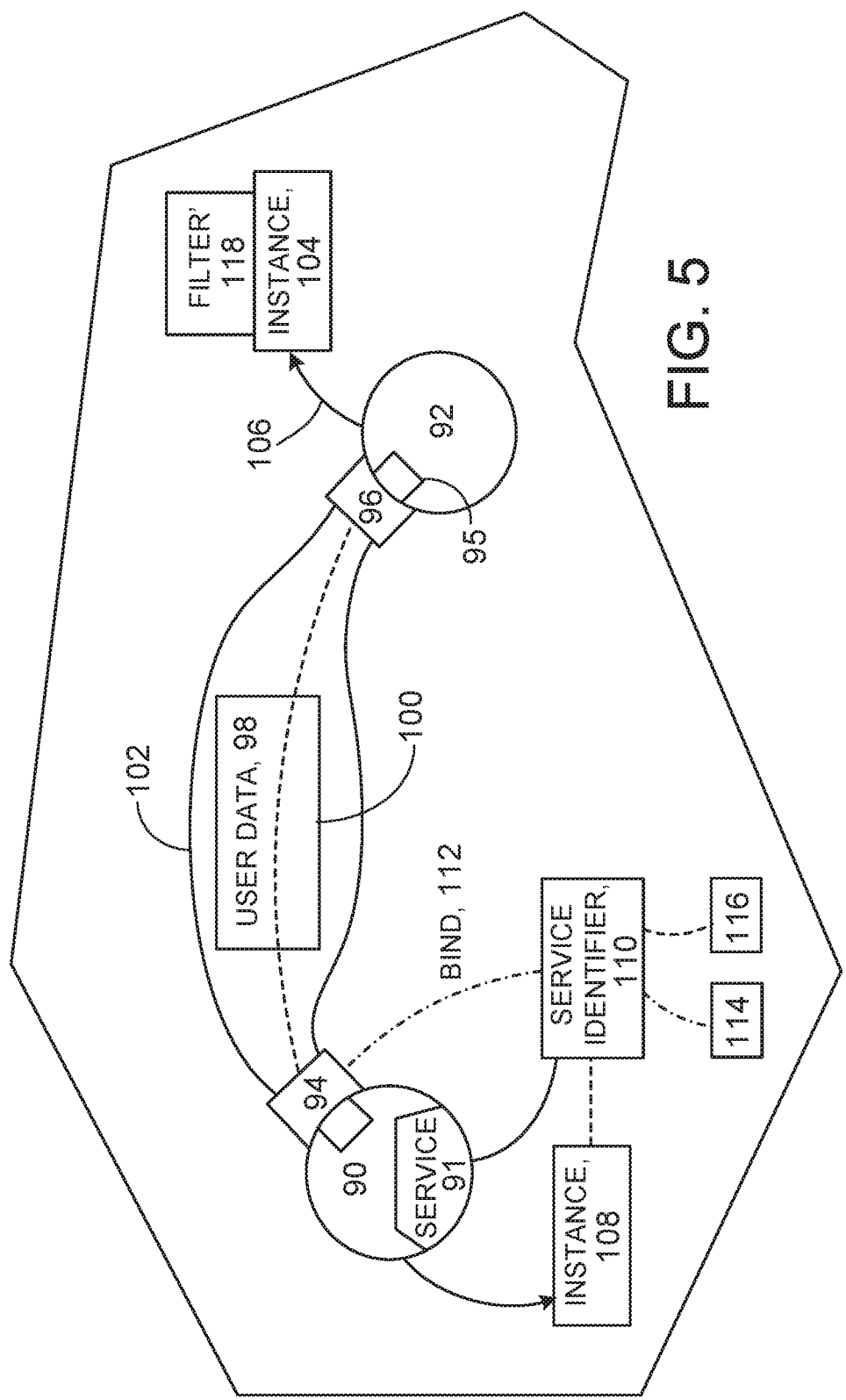

As shown in FIG. 5, the mesh 89 also enables user applications 90, 92 to communicate directly with each other by opening so-called service handles 94, 96 and exchanging user data 98 by means of the service handles. A service handle is an opaque memento that universally and uniquely represents a persistent communication endpoint 93, 95 that may send or receive user data in the form of client datagrams 100. The client datagram exchange protocol is connectionless. A service handle need only be open to enable a client to send or receive client datagrams. Any two open service handles 94, 96 define a channel 102 across which client datagrams 100 may flow.

Though a user application may have explicit prior knowledge of a specific service handle that facilitates a particular service, for example, at another node, the user application can also query its network transport software 104 (for example, an instance that is hosted by the same node as the user application) using a service identifier 106 that names the needed service in a general way. A user application 90 that offers a service 91 may ask its network transport software 108 to bind 112 a service identifier 110 to each service handle 94 that facilitates the service; this process is called service advertisement.

Once a service handle is bound to a service identifier, it can be discovered by a user application. Service identifiers need not be unique. In some implementations, many service handles 114, 116 advertise the same service identifier. If there are multiple service handles matching a particular service identifier, the network transport software can apply additional filters 118 specified by a query 106 from the user application and answer with the service handles that satisfy the query.

This arrangement allows the network transport software to provide on-demand load balancing, nearness routing, anycast routing, or other advanced routing capabilities or any combination of two or more of them, and provide other management functions, in the course of satisfying the queries of user applications. In some implementations, rules can be implemented to ensure that service clients do not discover inappropriate service providers. For example, two service handles are allowed to bind the same service identifier if and only if they offer the same service in the same way. An organization responsible for administration of a network transport layer mesh may wish to establish a naming authority and procedures to prevent accidental collisions in the global service identifier namespace in the network transport software mesh.

Figure 6:
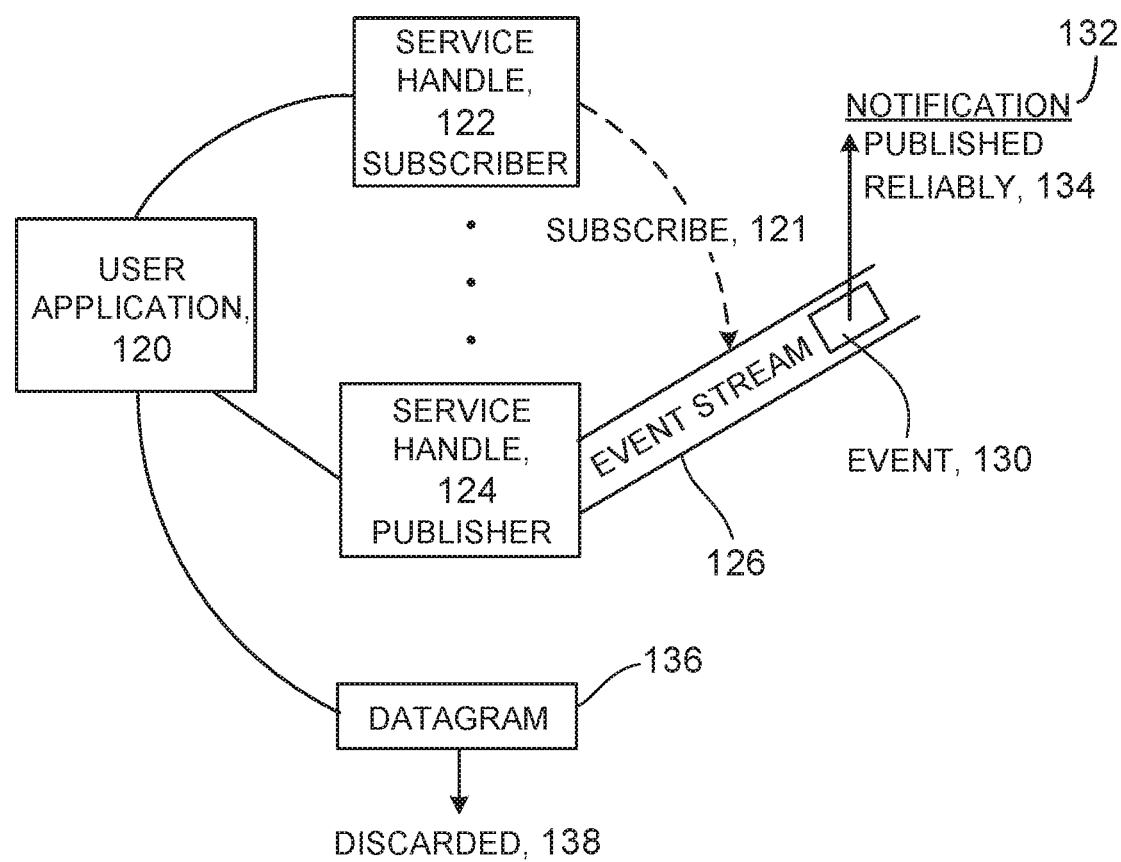

As shown in FIG. 6, a user application 120 may subscribe 121 any of its open service handles 122 to an event stream 126 of any other service handle 124, even one that has never been opened. We name the former service handle as the subscriber 122 and the latter as the publisher 124. When an interesting event 130 occurs in the lifecycle of the publisher, such as its opening or closing, it publishes a notification 132 of this event to all subscribers. Event notifications from a given publisher are reliably delivered 134 in occurrence order to all of its subscribers. Event notifications are guaranteed to be unique; a network layer software instance sends only a single notification of an event, and no subscriber ever receives a duplicate notification, even in the presence of a chaotic or unstable network.

Application (e.g. client) datagrams 136 are delivered on a best-effort basis, and the mesh is engineered to perform well even under systemic heavy load. However, in some implementations, a network layer software instance of the mesh may discard 138 a client datagram at its discretion. User applications that directly use the client datagram transport must accept the possibility of arbitrary loss of client datagrams, though in practice the software instance only discards client datagrams associated with slow flowing channels, and only when the system is globally stressed by extremely heavy traffic.

Because routes through the mesh may change as a result of node failures, network outages, and autodiscovery of new network layer software instances in the mesh, the client datagrams may reach their destination service handles in an order different from the order in which they were sent from the source service handle. The mesh can be configured to buffer client datagrams and be tuned to match an environment's prevailing use cases. The buffering can include sensible defaults that are suitable for most traffic patterns.

Though this combination of unreliable user datagrams 139 and reliable event notifications 134 is sufficiently useful for many user applications, a transport layer can also provide reliable in-order delivery of user data. A user of the network layer software can engineer transport layers above the platform-neutral network transport layer provided by the network layer software. In some implementations, a higher-level transport layer 29 (FIG. 2) can be bundled and deployed with the network transport software. This higher-level transport layer may contain production-quality client libraries 31 that implement a powerful and robust connection-oriented reliable streaming protocol that leverages a broad spectrum of the network transport software's capabilities.

Returning to autodiscovery, to reduce user configuration costs and maximize reliability, the network transport software and its nodes may use a continuous autodiscovery process to identify peer nodes and to establish and maintain a viable mesh. The autodiscovery process involves periodic interchange of UDP messages that trigger TCP connection attempts. This process also can help to ensure that lost TCP connections are automatically restored as quickly as network conditions permit.

Once the network transport software on a node is running, it starts a timer that expires periodically with a user-defined period having a default value, e.g., 10,000 ms (10s). This timer defines a greeter heartbeat, and controls a rate at which autodiscovery messages are broadcast by that instance of the network transport software over UDP. The timing of the initial heartbeat at a given software instance is randomized to occur within a span established by the period to introduce arrhythmia among nodes cooperating within the mesh. The arrhythmia reduces the likelihood and impact of pulsed UDP broadcasts that would otherwise result as a consequence of starting the network transport software on many nodes simultaneously. This strategy reduces the number of UDP packets dropped by network hardware (UDP packets are typically dropped before other packets).

Once per heartbeat, the network transport software of a given node broadcasts a request-greetings message over UDP to each target network. By default, the network transport software of a node targets all networks in which the node participates. The request-greetings message includes a network transport software identifier (47, 49, 53, FIG. 3) that uniquely identifies the sender node on its mesh. This identifier is <node name, server port number>, where a node name is a size-prefixed UTF-8 string that represents, for example, the DNS name, IPv4 address, or IPv6 address of the network transport software host node.

When network transport software hosted on a node receives a request-greetings message, it resolves the network transport software identifier contained in the message into an IP address, if necessary. If a TCP connection to the sender does not already exist, the receiver replies by unicast over UDP using a greetings message. A greetings message includes the sender's network transport software identifier. The receiver then initiates a TCP connection to the indicated <IP address, server port number>. If a TCP connection to the sender already exists, then the request-greetings message is discarded without further action.

In some implementations, two nodes each hosting the network transport software in a mesh may race to establish TCP connections with one another. The network transport software hosted on many nodes may be started virtually simultaneously and it is desirable to maintain only one TCP connection between any two nodes in order to make most efficient use of network resources. Since the network transport software identifiers are unique within a mesh, they can be used to define a total order of the TCP connections. In some implementations, when TCP connections are established between two nodes of a mesh, the network transport software with the lower collating network transport software identifier checks for the existence of a preexisting TCP connection. If it discovers such a connection, it disestablishes the TCP connection that it initiated and preserves the other. The synchronization mechanisms that control the internal TCP connection management data structures ensure that one of these two connections must complete strictly before the other, therefore the algorithm guarantees that redundant connections are ephemeral. Two nodes in a mesh, each hosting network transport software, separated by a firewall 63 (FIG. 3), and segregated by network address translation (NAT) can therefore reliably communicate with one another; as long as one of the nodes is reachable from the other, then a full-duplex connection may be established between them.

A user application that wants to take advantage of the network transport software autodiscovery process may listen for request-greetings messages on the appropriate UDP port. The user application does not respond to the request-greetings message with a greetings message, so as not to be confused for another network transport software instance by the originator of the request-greetings message. In deployment scenarios that are grid-like, the network transport software will cohabit with respective user applications. Therefore a user application should typically attempt to establish a TCP connection to the same node's standard network transport software port before resorting to listening for request-greetings messages in order to locate a viable network transport software instance.

With respect to protocol version negotiation, after an application connection is established from an arbitrary user (e.g., client) application to a node (e.g., a server node), network transport software protocol versions are negotiated to ensure mutual compatibility. Each conformant client application honors a list of acceptable server protocol versions. Each network transport software instance as a server honors a list of acceptable client protocol versions. In some implementations, the network transport software acts both as a client, e.g., when establishing an outgoing TCP connection to another node in the mesh, and as a server, e.g., when accepting a TCP connection. This scheme ensures sliding windows of backward and forward compatibility among network transport software implementations.

Protocol version negotiation must be completed successfully before any requests may be issued, responses given, or user data exchanged. To reduce the burden of implementation for both user (e.g., client) application and mesh developers, liveness messages may be exchanged before or during protocol negotiation.

When a client application has successfully established an application connection, the client transmits a client-version message that encapsulates a size-prefixed UTF-8 string that uniquely identifies the client's preferred network transport software protocol version. The content of a network transport software protocol string can be dictated exclusively by a single controlling source (such as MioSoft Corporation). In some implementations, actual network transport software protocol strings can be conventionally conformed to the format "MUX YYYY.MM.DD", where YYYY is the four-digit Gregorian year, MM is the one-based two-digit month ordinal, and DD is the one-based two-digit day ordinal. The date can correspond to a design date of the network transport software protocol.

When the server receives this client-version message, it checks the embedded protocol version for membership in its list of acceptable client protocol versions to see if it can guarantee protocol version compatibility. The server responds with a server-version message that contains its own preferred network transport software protocol version and a protocol version compatibility assertion. This assertion is a Boolean value that is the result of the membership test. A value of true indicates that the server guarantees protocol compatibility with the client; a value of false disclaims any such guarantee.

When a client receives this server-version message, it checks the protocol version compatibility assertion. If the assertion is true, then protocol version negotiation has completed successfully. If the assertion is false, then the client checks the embedded protocol version for membership in its list of acceptable server protocol versions. If the membership test is positive, then protocol version negotiation has completed successfully.

If both 1) the compatibility assertion was false and 2) the client-side membership test was negative, then protocol version negotiation has failed: the client and server have no protocol versions in common and are therefore incompatible. No requests may be sent, no responses may be received, and no user data may be interchanged. When a client has detected this situation, it disconnects from the server without transmitting any additional messages.

If protocol version negotiation is completed successfully, then the client may transmit service requests and user data with the expectation that the server understands incoming messages and will react appropriately.

Figure 7:
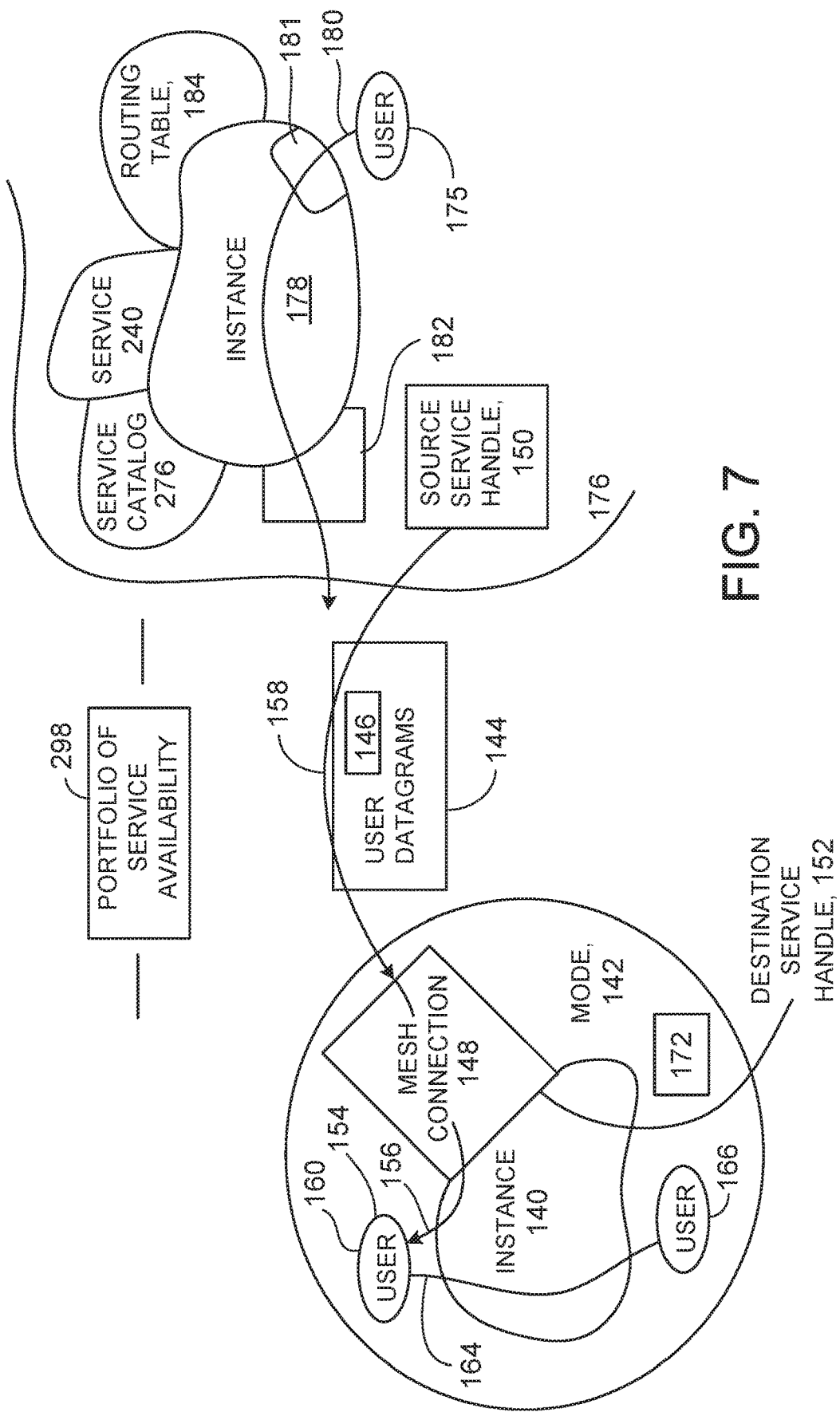

As shown in FIG. 7, with respect to routing, the network transport software 140 at a node 142 is responsible for delivering any user (e.g., client) datagrams 144 (in which user data is wrapped) that arrive along its incoming TCP mesh connections 148. A client-datagram message (which we often refer to simply as a client datagram) originates at a particular source service handle 150 and travels across the mesh to its destination service handle 152. When a client-datagram message reaches the network transport software that is responsible for the destination service handle, the network transport software checks the status of the destination service handle. If the service handle is open, then the network transport software delivers the client-datagram message to the user application 154 at the other end 156 of the appropriate TCP client connection 158. If the service handle is not open, then the network transport software discards 160 the client datagram.

If a user application 154 sends a client-datagram message 164 to another user application 166 that is directly associated with the same node 142 hosting both user applications, then the network transport software 140 simply navigates its own internal data structures to deliver the message. In some implementations, the user applications 175, 154 are remote from each other and reside on different network nodes 142, 176. In this case, the network transport software 178 routes an incoming client-datagram message 180 across one of its active inter-network transport software TCP mesh connections 182 toward the intended recipient 154. The network transport software accomplishes this by participation in a collaborative dynamic routing protocol.

The network transport software on each node in the mesh maintains its own routing table 184 for directing incoming messages using only locally available information. The routing table is a collection of <destination network transport software identifier, neighboring network transport software identifier>. Each such tuple associates a destination with the neighbor to which a message bound for the destination should be forwarded. A neighbor is a node to which a live outgoing TCP connection exists. A node's neighborhood comprises all of its neighbors.

A node in the mesh may reliably send messages to any neighbor over a corresponding TCP mesh connection. Such a message either arrives at the neighbor or results in a TCP error on the TCP mesh connection. To detect connection outages as quickly as possible, a node periodically transmits liveness messages across all its TCP connections, including its application connections 181 and its TCP mesh connections 182. The frequency of these messages is configurable.

The network transport software at a node schedules a rebuilding of its routing table whenever another node running a network transport software instance joins or leaves its neighborhood. While a node waits to rebuild its routing table, any other change to its neighborhood triggers the renewal of the complete scheduling quantum. Therefore incremental changes in the neighborhood result in incremental lengthening of this postponement. Rebuilding of the routing table for a node that participates in a large mesh requires effort linear in the size of the mesh, and this postponement reduces unnecessary computation of intermediate routing tables (and transmission of neighborhood snapshots) during periods of high mesh flux that may exist, for example, when the network transport software on many nodes are started or stopped in quick succession.

As a result of any neighborhood change, a node saves a new neighborhood snapshot that combines its network transport software identifier, a monotonically increasing snapshot version number, and the new membership of the neighborhood. Some implementations use the nanoseconds elapsed since the Unix epoch (1970-01-01T00:00:00Z [ISO 8601]) as the snapshot version number. A node saves not only its own neighborhood snapshot, but also a collection of neighborhood snapshots that describe other nodes. Coincident with the inchoate rebuilding of the routing table, the network transport software transmits a neighborhood-snapshot message that encloses its own neighborhood snapshot and a list of recipients. The list of recipients is identical to the current neighbors. The message is sent to all recipients.

When the network transport software receives a neighborhood-snapshot message, it saves the contained neighborhood snapshot if and only if 1) it has never received a neighborhood snapshot from the associated node or 2) its snapshot version number exceeds the one associated with the corresponding saved neighborhood snapshot. In other circumstances, the network transport software discards the message and takes no further action regarding it. This prevents old neighborhood snapshots that were arbitrarily delayed by long routes or unusual mesh topologies from regressing a node's knowledge about the remote neighborhood. Assuming that the network transport software saved the neighborhood snapshot, it then computes the set difference between its own neighbors and the enclosing message's recipients. If the difference is not the empty set, then the network transport software constructs a new neighborhood-snapshot message that encloses the foreign snapshot and the set union of the original recipients and the previously computed difference. The network transport software then transmits the new message to all members of the difference. Accordingly, no neighborhood-snapshot messages will be circularly routed; the algorithm terminates. Irrespective of whether any new messages were actually sent, the network transport software schedules the rebuilding of its routing table (or renews the scheduling quantum of an outstanding delayed rebuild).

The algorithm that rebuilds the routing table accepts as inputs all saved neighborhood snapshots, including the node's own, and produces as output a routing table. The saved neighborhood snapshots implicitly define a connectivity graph of a mesh. The routing algorithm seeds a work queue and new routing table with the executing node's direct neighbors. It then consumes the work queue, adding new routes and work queue items only for destinations that have not yet been routed. This constitutes a breadth-first traversal of the connectivity graph, thereby ensuring that when a new network transport software identifier is first encountered, the route established will be the shortest possible. The algorithm has linear space and time requirements. In particular, it requires O(n) space, where n is the number of nodes participating in the mesh under consideration, and O(e) time, where e is the number of neighbor relationships existing among these nodes.

The neighborhood snapshot propagation and routing table construction algorithms allow all nodes participating in a mesh to converge in parallel to have a uniform view of mesh connectivity, and each node to have a routing table optimized for its own location within the graph. When a routing decision needs to be made, for example, because a client-datagram message has just arrived at a node, the decision may be made using only locally available information. The use of a stable mesh provides advantages. For example, once the mesh quiesces with respect to node membership and connectivity, all routing decisions in the mesh may be made without requiring further control message traffic overhead.

In some implementations, in which the mesh may not be stable, circular routing of client-datagram messages can be prevented without using a mechanism such as TCP's Time To Live (TTL) that causes each router that handles a packet to decrement an embedded counter before retransmission and to discard the packet if the value reaches zero. In some implementations, the platform-neutral network transport layer uses a system of postmarks. When a node receives a client-datagram message and is neither its source nor destination node, it appends its own network transport software identifier to a list of postmarks before retransmitting the message. The source and destination network transport software identifiers encoded by the source and destination service handles are automatically treated as postmarks, so it would be redundant for the source and destination nodes to append their identifiers explicitly.

If a node discovers its own postmark on an incoming client-datagram message destined for some other node, it discards the message to curtail unbounded circular routing. Accordingly, arbitrarily long routes at the expense of greater overhead per client datagram are allowed. Most environments are expected to establish mesh cliques in which every node has all other nodes as its neighbors. In such a clique, the overhead is limited to the necessary source and destination network transport software identifiers.

For most user applications, knowledge of the membership and connectivity of the actual mesh is unnecessary. These applications simply use and provide services as clients or servers, respectively. User applications that wish to provide services acquire a service handle and bind an appropriate service identifier. User applications that wish to use services either employ statically known service identifiers or statically known service handles to locate and contact services.

In some implementations, some user applications monitor mesh health and report status. To support such user applications, the network transport software provides a service 240 to which an application may subscribe to receive notifications of routing events. In particular, whenever the reachability of a set of nodes change, all nodes send to each interested user application a routing-notification message that contains a reachability state {reachable, unreachable} and a list of network transport software identifiers that denote the nodes whose reachability has changed. A user application registers interest in routing notifications by sending its network transport software a routing-subscribe message that includes the service handle that should begin receiving routing notifications. If the user application no longer wishes to receive routing notifications, it may transmit a routing-unsubscribe message that contains a previously subscribed service handle.

Figure 12:
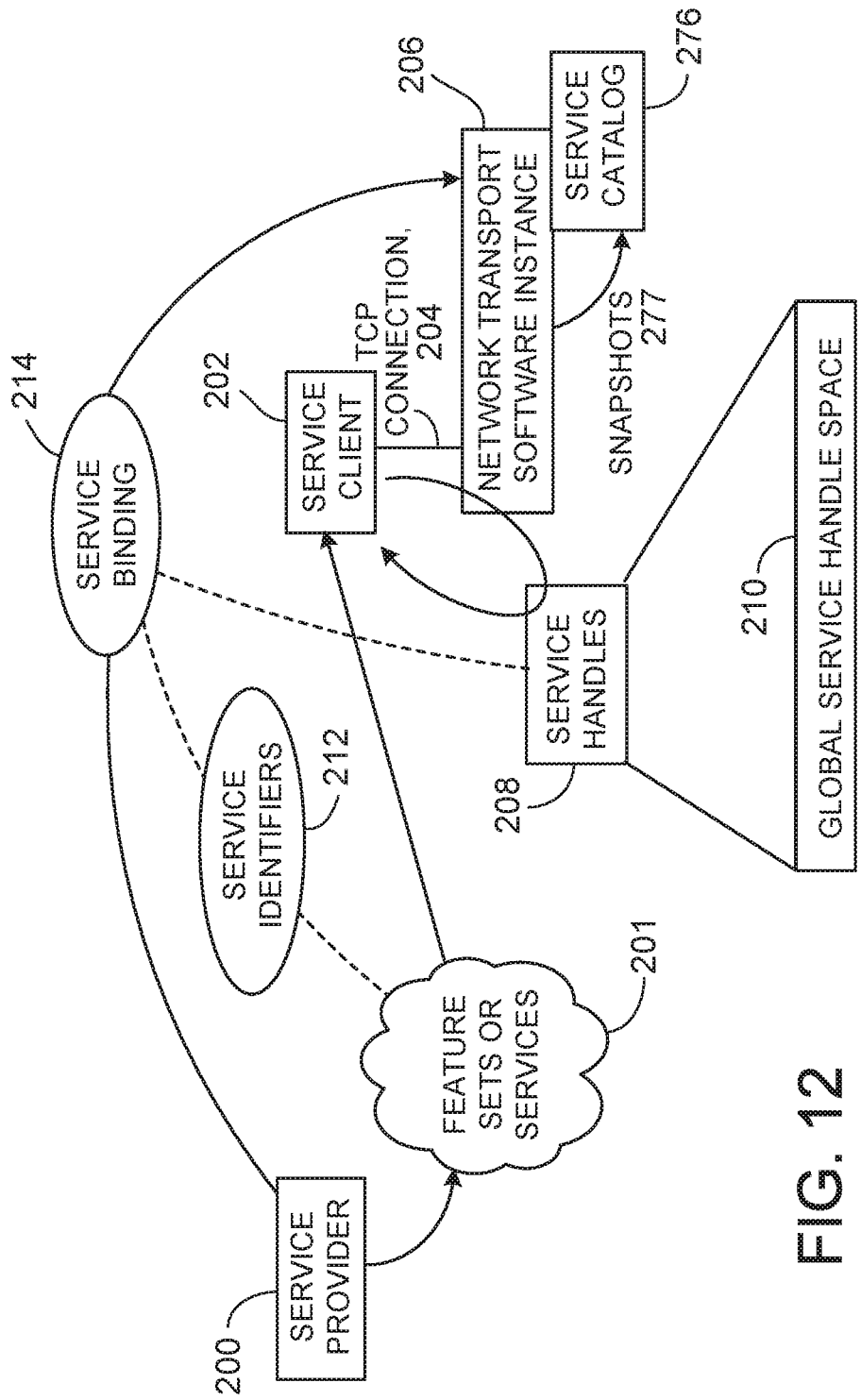

As shown in FIG. 12, in typical implementations, user applications that leverage (make use of) a mesh have at least one or both of two characteristics: they are service providers 200 that offer feature sets or services 201 or they are service clients 202 that request and use those feature sets or services. Such arrangements can adhere to the client-server model of distributed computing. Peer-to-peer relationships among user applications are not precluded. A combination of client-server and peer-to-peer arrangement could also be implemented.

Once a user application has established a TCP connection 204 with the network transport software 206 hosted on a node, the user application acquires ownership of one or more service handles 208 by which it communicates with other user applications (located either locally or at remote nodes). These other user applications may be clients that will contact the service handles 208 to request services. They may also be servers that offer services through their own service handles, in which case the user application that owns service handles 208 may contact these service handles to request services. Conforming user applications treat service handles as opaque atomic values. From a node's perspective, however, a service handle is not opaque, but rather a <network transport software identifier, UUID>, where UUID is a 128-bit Leach-Salt variant 4 universally unique identifier [RFC 4122].

To obtain a service handle for its use either as a service consumer, service provider, or both, a user application sends its network transport software a request-service-handle message that contains a new conversation identifier. A conversation identifier can be, for example, a 64-bit integral value that uniquely identifies a request-response transaction between the user application and its network transport software. Upon receipt of the request-service-handle message, the network transport software responds with a new-service-handle message that contains the same conversation identifier and a newly allocated, statistically unique service handle. The network transport software identifier embedded in this service handle denotes the network transport software that allocated it, which allows for correct routing of messages.

At this point, the network transport software has created a new value in the vast global space 210 of service handles. Before a user application can use the new service handle, it sends its network transport software an open-service-handle message. This message contains a new conversation identifier and the freshly allocated service handle. When the network transport software receives this message, it registers the service handle with the sender, thereby causing the service handle to enter an open state, and replies with a client-acknowledgement message that includes the request's conversation identifier and an acknowledgment code of ok.

A service handle is open if it is registered with a user application; it is closed if it is not registered with a user application. All service handles begin in the closed state. In addition, every unallocated service handle is considered closed by the network transport software, making the closed state independent of the existence of the service handle. The complete set of service handle states is {open, closed, unreachable}. (The unreachable state is a pseudo-state used by the service handle notification mechanism to indicate that all routes to a remote publisher have been lost, as discussed further below.)

An application that wants to operate as a service provider will typically open one or more service handles to listen for incoming service requests. Unlike an Internet socket, which is an ephemeral binding of <IP address, port number>, a service handle is a persistent entity. Service handles are drawn from a vast space, and a service handle can be reused if it conceptually describes the same communication endpoint across all instantiations of the service provider. In some implementations, a service client also uses service handles persistently. This persistence of service handles and their use allows for the creation and maintenance of private networks of user applications within a mesh. For example, if service provider applications and their client applications make prior agreements, then they may communicate using unadvertised service handles, thereby effectively privatizing their communication by excluding the possibility that other user applications can discover the participating service handles and send client datagrams to them.

In some situations, a service client will not know the exact service handle with which it should communicate to use a service. To support service clients more flexibly and anonymously, a service provider may issue a bind-service-identifier message that contains a new conversation identifier and a service binding 214 of <service identifier, open service handle>. A service identifier 212 is a size-prefixed UTF-8 string that names the service in a way expected by the service provider's clients. Upon receipt, the network transport software enters the service binding into the service catalog 276. The service catalog is the collection of all service bindings. Because each service handle also identifies the node responsible for it, i.e., the one to which the owning user application is attached, the service catalog indicates where all services can be contacted. Finally the network transport software replies with a client-acknowledgment message that contains the request's conversation identifier and an acknowledgment code of ok. A service provider is free to bind more than one service identifier to an open service handle, for example, by transmitting one bind-service-identifier message for each desired binding.

When a change in local service offerings occurs, the network transport software of the local node saves a new service catalog snapshot 277 that combines its network transport software identifier, a monotonically increasing snapshot version number, and the new collection of local service bindings. Some implementations may use the nanoseconds elapsed since the Unix epoch (1970-01-01T00:00:00Z [ISO 8601]) as the snapshot version number. A node saves not only its own service catalog snapshot, but also a collection of service catalog snapshots that describe the services offered by user applications attached to other nodes.

Whenever a node saves a service catalog snapshot of its own local service offerings, either as a result of establishment or disestablishment of service bindings, it schedules a task that will transmit a service-catalog-snapshot message that encloses this service catalog snapshot and a list of recipients. The list of recipients is identical to the current neighbors. The message is sent to all recipients.

While a node waits to transmit, any other change to its local service offerings triggers a renewal of the complete scheduling quantum. Therefore incremental updates result in incremental lengthening of this postponement. This incremental lengthening avoids unnecessary transmission of service catalog snapshots during periods of high service flux such as prevail when many nodes are started or stopped in quick succession.

When a node receives a service-catalog-snapshot message, it saves the contained service catalog snapshot if and only if 1) it has never received a service catalog snapshot from the associated node or 2) its snapshot version number exceeds the one associated with the corresponding saved service catalog snapshot. In other circumstances the node discards the message and takes no further action regarding the message. Old service catalog snapshots that were arbitrarily delayed by long routes or unusual mesh topologies are therefore prevented from regressing a node's knowledge about remote service offerings.

Assuming that the node saved the service catalog snapshot, it computes two sets by comparing the old service catalog snapshot and the new service catalog snapshot. The first set comprises the bindings to be added to the service catalog and embodies the bindings present in the new snapshot but not the old. The second set comprises the bindings to be removed from the service catalog, and embodies the bindings present in the old snapshot but not the new. The contents of the first set are immediately added to the service catalog; the contents of the second set are immediately removed from the service catalog. The network transport software then computes the set difference between its own neighbors and the enclosing message's recipients. If the difference is not the empty set, then the network transport software constructs a new service-catalog-snapshot message that encloses the foreign snapshot and the set union of the original recipients and the previously computed difference. The network transport software then transmits the new message to all members of the difference. No service-catalog-snapshot messages will be circularly routed, and the algorithm terminates.

The service catalog snapshot propagation and service catalog construction algorithms allow all nodes participating in a mesh to converge in parallel to have a uniform view (portfolio) 298 of service availability. When a service query arrives, it may be resolved using only locally available information. A stable service portfolio can provide advantages. For example, once a stable service portfolio materializes, all service resolution decisions may be made without requiring further control message traffic overhead.

To find a service, a user application sends its node a locate-services message. This message comprises a new conversation identifier, a service identifier match pattern, the desired match mode, the desired locate mode, and the response timeout as a 64-bit encoding of milliseconds. The service identifier match pattern is a size-prefixed UTF-8 string whose semantics are determined by the selected match mode, but is either a service identifier or a Java regular expression (as defined by java.util.regex.Pattern circa 1.6.0_19, for example) intended to match one or more service identifiers. In some implementations, the match modes can be {exact, pattern}, where exact means that the match pattern will be matched literally against the current service bindings, and pattern means that the match pattern will be applied using the regular expression match engine. In some implementations, the locate modes are {all, any}, where all means that the network transport software should reply with every matching service binding, and any means that the network transport software should reply arbitrarily with any matching service binding.

When a node receives a locate-services message, it attempts the specified lookup against its complete service catalog. If matches are discovered, then the node replies immediately with a service-list message that includes the same conversation identifier and an appropriate number and kind of matching service bindings. The complete bindings are provided so that the requester has access to the exact service identifiers as well as their bound service handles; this is particularly useful for clients that used the pattern match mode. If no matches are discovered, then the node adds the request to a set of pending requests and schedules a timer that will fire when the response timeout specified in the locate-services message expires.

Whenever new service bindings are established as a result of processing either a bind-service-identifier message or a service-catalog-snapshot message, the node checks each pending request against the new service bindings. Any matches result in immediate removal from the set of pending requests, disablement of the timer, and transmission of appropriate service-list messages. If the timer expires before the corresponding request matches any service bindings, then the node removes the request from the set of pending requests and sends a service-list message that contains no service bindings.

Because a service-list message may contain multiple service bindings, it is arranged that a service client that wishes to contact a particular service will decide which service handle to select. Equal service identifiers will designate equal services, so a user application that wishes to contact a service by a particular service identifier may arbitrarily select from the retrieved bindings any service handle bound to that service identifier. Generally a user application will not be able to decide intelligently among service handles for equal service identifiers, so only an arbitrary decision will be possible. The organization responsible for a mesh may be operated so as to assign distinct names to distinct services and identical names to identical services. Though equal service identifiers will denote equal services (i.e., services that do the same things in the same ways), usually a user application cannot intelligently decide among service bindings that embed equal service identifiers. There may be a best decision, e.g., the least stressed or least distant of all services answer by the query, but a user application is typically at a wrong vantage point to arrive at a sensible decision. The network transport software sometimes can make better decisions on a service client's behalf, for example, when an appropriate locate mode is specified in the locate-services message. Future locate modes can directly support service provider proximity and load balancing.

A service provider may unbind any service binding previously established for one of its open service handles, e.g., by sending its network transport software instance an unbind-service-identifier message that encloses a new conversation identifier and a service binding. A node that receives such a message removes the service binding from its local service offerings, saves a new service catalog snapshot, and schedules the transmission of a service-catalog-snapshot message as described in detail above. After local updates are complete, the network transport software replies with a client-acknowledgment message that includes the request's conversation identifier and an acknowledgment code of ok.

Figure 8:
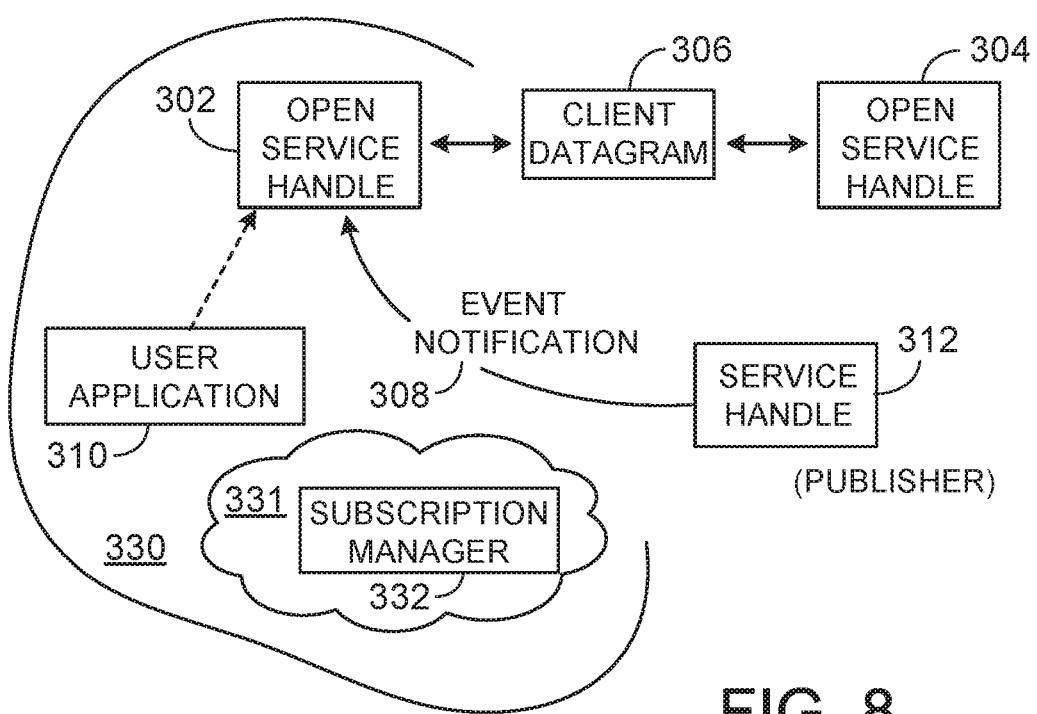

As shown in FIG. 8, two open service handles 302, 304 may exchange client datagrams 306. In some implementations, all user data is transferred between user applications in this fashion (that is, using datagrams). Because this base communication protocol provided by the network transport software is fundamentally connectionless, it is important that user applications know when their peers are available to send and receive datagrams. In some implementations, a user application 310 subscribes an open service handle to receive event notifications 308 emitted by another service handle 312. The former service handle is the subscriber and the latter the publisher. To subscribe a service handle to a publisher, the user application sends its network transport software a service-handle-subscribe message that contains a new conversation identifier, the subscriber, and the publisher. After locally registering the client's interest, the network transport software replies with a client-acknowledgment message that includes the request's conversation identifier and an acknowledgment code of ok.

A subscribed service handle may occasionally receive service-handle-notification messages about its publishers. A service-handle-notification message embodies a subscriber registered to the receiving client, a publisher, and the publisher's state circa message creation time. In some implementations, such a message is created and transmitted if and only if the publisher changes state. No duplicate notifications are sent by a node or received by a client. All notifications of publisher state changes are therefore real and may be reacted to accordingly by clients without the necessity for complicated client-side state tracking logic.

In some implementations, a client uses these notifications as a data valve.

A notification that a publisher is open indicates that the client may begin sending client datagrams to the publisher and may expect, depending on the style of communication, to receive messages from the publisher.

A notification that a publisher is closed indicates that the client should not send new client datagrams to the publisher. Because many paths may exist in a mesh, some client datagrams may arrive at the publisher after a closed notification is sent. Such client datagrams arriving from closed service handles may be discarded. In some implementations, the specific application domain should drive this policy decision of whether to discard such client datagrams.

A notification that a publisher is unreachable indicates that the last route between the client's and publisher's network transport software instances has evaporated. While a publisher is unreachable, it may undergo state changes of which its subscribers are not informed. Because all inter-node links are full-duplex, reachability (ergo unreachability) of nodes is symmetric. As in the above case, such an unavailability notification may race with client datagrams bound for the subscriber. In some implementations, any notifications received by a node that originate at an unreachable publisher are ignored, i.e., they are not forwarded along to subscribers. Subsequent receipt of an open or closed publisher state implies that the local and remote nodes are once again mutually reachable; the reported state is circa reestablishment of the route between the two nodes.

Sometimes a client may no longer wish to receive notifications from a particular publisher at a particular subscriber. The client may send a service-handle-unsubscribe message containing a new conversation identifier, the subscriber, and the publisher. Upon receipt, the network transport software deregisters the subscriber's interest in the publisher and replies with a client-acknowledgment message that includes the request's conversation identifier and an acknowledgment code of ok.

A transport layer software instance 331 in a node 330 employs a service handle subscription manager 332 to track its clients' service handle subscriptions. The subscription manager keeps several sets of data structures for the purpose of managing subscriptions and service handle state transitions. In some implementations, the first set comprises the following:

1. The client subscribers map, a map {publisher→local subscriber}, where publisher is a service handle and local subscriber is the set of locally registered service handles that subscribe to the key. This map supports efficient delivery of notifications.
2. The client publishers map, a map {local subscriber→publishers}, where local subscriber is a locally registered service handle and publishers are the set of service handles to which the key subscribes. This map supports efficient cleanup when a service handle is closed, e.g., when the service handle is explicitly closed or when a client connection is lost.
3. The publishers by network transport software instance map, a map {network transport software identifier→publishers}, where network transport software identifier denotes any node participating in the mesh and publishers are the set of service handles registered to the key's referent. This map supports efficient reaction to changes in the reachability of the network transport software on the nodes.

When a node receives a service-handle-subscribe message, its service handle subscription manager updates these maps, in lockstep. As a result: the client subscribers map now lists the subscriber in its publisher's set of subscribers; the client publishers map now lists the publisher in the subscriber's set of publishers; the publishers by network transport software instance map now lists the publisher in its network transport software identifier's set of registered publishers. The local network transport software takes note of whether this was an initial subscription, that is, the first time that one of its registered service handles subscribed to the specified publisher.

When a node receives a service-handle-unsubscribe message, its service handle subscription manager also updates these maps in lockstep. As a result: the client subscribers map no longer lists the subscriber in its publisher's set of subscribers; the client publishers map no longer lists the publisher in the subscriber's set of publishers; the publishers by network transport software instance map no longer lists the publisher in its network transport software identifier's set of registered publishers. The local network transport software takes note of whether this was a final unsubscription, that is, there are no longer any registered service handles subscribed to the specified publisher.

The service handle subscription manager uses a two-tiered mechanism for managing service handle subscriptions.

The first tier associates open subscribers with publishers, using the data structures described above. When a client subscribes one of its service handles to a publisher registered to another client attached to the same node, only the first tier is necessary to manage subscriptions and to correctly deliver service handle state notifications. Since only one node is involved, whenever the publisher becomes open or closed, the node may directly notify all local subscribers by full-duplex application connections to the corresponding clients. Similarly, a node does not need to inform a local subscriber that a local publisher is unreachable. To deliver notifications from a particular local publisher, a node fetches from the client subscribers map the set associated with the publisher. The network transport software iterates over this set and sends one service-handle-notification message to each client for each registered subscriber. In some implementations, a node does this whenever a change in a local publisher's state is detected, for instance, as a result of processing an open-service-handle message.

The second tier associates nodes that have open subscribers with remote publishers. To support this second tier, the service handle subscription manager keeps a second set of data structures. Examples of the set second of data structures include:

1. The network transport software subscribers map, a map {local publisher→network transport software identifiers}, where local publisher is a locally registered service handle and network transport software identifiers are a set of network transport software identifiers denoting remote nodes that have subscribers to the key. This map supports efficient transmission of notifications.
2. The network transport software publishers map, a map {network transport software identifier→local publishers}, where network transport software identifier denotes a remote node and local publishers is a set of publishers for which the key has subscribers. This map supports efficient implementation of the mechanism that propagates service handle states after a network transport software cycles.
3. The network transport software subscription conversation map, a map {network transport software service handle subscription key→subscription conversation}. A network transport software service handle subscription key is a <publisher, network transport software identifier>, where publisher is a locally registered service handle and network transport software identifier describes a node that has subscribers to this publisher. A subscription conversation is a <conversation identifier, reaper phase number>, where conversation identifier describes the conversation identifier embedded within the most recently received second-tier subscription control message. The reaper phase number corresponds to a particular performance of the reaper task that is responsible for cleaning up defunct conversations (also discussed below). This map provides informational monotonicity of subscription conversations.

Examples of control messages for the second-tier subscription include: node-service-handle-subscribe, node-service-handle-unsubscribe, node-request-service-handle-notifications, node-service-handle-notification. Any of these messages may be routed through intermediate nodes en route to their destinations.

There can be many available routes in a mesh (or dropped network frames that result in retransmissions), and it is possible that control messages arrive out of order. In some implementations, a control message that is not new is ignored to prevent regression of a subscription conversation. A second-tier subscription control message is considered new if 1) no conversation is extant about the subscription key, or 2) the conversation identifier embedded in the message is newer than the one recorded in the ongoing conversation. If a second-tier subscription control message is determined to be new, then the node receiving the message updates the network transport software subscription conversation map such that the appropriate subscription key subsequently binds a new conversation comprising the conversation identifier embedded in the message and the next reaper phase number. Soon after receipt of a second-tier subscription control message, the receiver replies unreliably with a routable node-acknowledgment message that contains the request's conversation identifier and an acknowledgment code of ok. The main processing can occur after this acknowledgment is sent.

Every initial subscription to a remote publisher causes the local network transport software to subscribe itself to the publisher by reliably routing a node-service-handle-subscribe message to the publisher's node. This message encloses a new conversation identifier and an appropriate network transport software service handle subscription key that specifies the publisher and the subscribing node. When a node receives such a message, it extracts the subscription key and looks up the conversation associated with it in the network transport software subscription conversation map. If the message is new, then the receiver updates the other second-tier maps in lock step. As a result: the network transport software subscribers map now lists the subscribing node in its publisher's set of subscribers; the network transport software publishers map now lists the publisher in the subscribing node's set of publishers. Finally the receiver reliably sends the subscribing node a node-service-handle-notification message that includes a new conversation identifier, the subscriber's network transport software identifier, the publisher, and the publisher's state circa message creation time. Additional complexities emerge when sending notifications about closed publishers shortly after starting up the network transport software on a node; these are described in greater detail below.

A subscribed node may occasionally receive node-service-handle-notification messages about its publishers, e.g., when a publisher changes state, for instance, because its network transport software processed a corresponding open-service-handle message. If a node-service-handle-notification message is new, then the receiver fetches from the client subscribers map the set associated with the described publisher. The receiving node iterates over this set and sends one service-handle-notification message to each client for each registered subscriber.

Upon receiving a final unsubscription from a remote publisher, the local node unsubscribes itself from the publisher by reliably routing a node-service-handle-unsubscribe message to the publisher's node. This message encloses a new conversation identifier and an appropriate network transport software service handle subscription key that specifies the publisher and the unsubscribing node. When a node receives such a message, it looks up the conversation associated with the specified subscription key in the network transport software subscription conversation map. If the message is new, then the receiver updates the other second-tier maps, in lock step. As a result: the network transport software subscribers map no longer lists the unsubscribing node in its publisher's set of subscribers; the network transport software publishers map no longer lists the publisher in the unsubscribing node's set of publishers.

Second-tier subscription control messages may be lost in transit. In some implementations, reliable delivery is necessary, e.g., for good performance of the service handle subscription mechanism. In some implementations, when these control messages are sent, copies are stored on the retransmission list. Additionally, a task is scheduled to execute recurrently once per complete quantum. This quantum, the retransmission rate, can be configured based on the system or the user's needs and has a default value of 5,000 ms (5 s). This task transmits the copy of the control message to its destination when executed. When a node receives a node-acknowledgment message, it removes the copied message whose conversation identifier matches from the retransmission list and cancels its corresponding retransmission task. A node-acknowledgment message is not required to be transmitted reliably, because its failure to appear causes the reflexive retransmission of the associated control message.

Sometimes the network transport software instance at a node may terminate, either as the result of processing a restart message or a shutdown message, user- or system-initiated termination of the node's operating system process, or software error. Under such circumstances, the application connections and TCP mesh connections between the network transport software instance and its neighbors and clients abort spontaneously without transmission of further control messages. Following the shutdown event, the node is deemed unreachable by other nodes participating in the mesh. Likewise any service handles registered by its clients are also deemed unreachable. Whenever a node determines that some nodes participating in the node mesh have become unreachable, it iteratively queries the publishers by the network transport software instance map using the network transport software identifiers of the unreachable nodes as keys. The network transport software then computes the set union of all resultant sets to determine the complete set of publishers now unreachable by their subscribers. The network transport software iterates over this set and sends one service-handle-notification message to each client for each registered subscriber.

When a downed node and/or its network transport software restarts, many clients will attempt to automatically reconnect to the new network transport software instance and to reestablish their service handles, service bindings, and subscriptions. Lest the service handles of these clients be deemed closed when the restarted node's presence is detected by other nodes, the restarted node observes a service reestablishment grace period. The duration of this grace period is configurable by the user and has a default value of 30,000 ms (30 s).

During the grace period, the node will not send a service-handle-notification message or node-service-handle-notification message that reports a closed state for its contained publisher. The network transport software instead enqueues the message on the service reestablishment grace queue for transmission when the grace period expires. If the state of the publisher transitions during this time, e.g., the network transport software, receives an appropriate open-service-handle message, then the enqueued message is discarded and a replacement message is sent to report the open state for its publisher. When the grace period expires, all messages still on the grace queue are sent to their respective destinations.

From a client's perspective, any unreachable publishers may be changing state arbitrarily during their nodes' or the network transport software's outage. This may indeed be the case if the unreachable network transport software instances have not cycled but rather some other condition has disrupted communication. An unplugged network cable may have this effect. Additionally, a local subscriber can be allowed to unsubscribe from an unreachable publisher, even though the publisher's network transport software is itself unreachable by definition.

To address such situations, the two nodes must coordinate their subscription and service handle states upon mutual determination of reachability. Each node achieves this effect by sending a node-request-service-handle-notifications message to its remote partner when it becomes reachable again. This message contains a new conversation identifier, the complete set of publishers recorded for the destination node in the publishers by network transport software instance map, and the network transport software identifier of the subscribing network transport software instance.

When the network transport software receives a node-request-service-handle-notifications message, it first computes a special network transport software service handle subscription key using the network transport software identifier of the subscribing node and the request notifications UUID, a UUID statically allocated from a range reserved by the network transport software for its internal use. This subscription key is used specifically to order node-request-service-handle-notifications messages within a special conversation. In some implementations, a complete set of publishers local to the receiving network transport software that was instantaneously correct at message creation time is embedded into the message. In such implementations, use of the special subscription key prevents aggregate regression of knowledge about second-tier subscriptions. If the message is new, then the receiver computes three sets:

1. The forgotten publishers. This is the set of publishers no longer present in the subscribing node's subscription list. To compute this set, first query the network transport software publishers map with the network transport software identifier of the subscribing network transport software. These are the last known publishers. Extract the publishers encapsulated in the node-request-service-handle-notifications message. These are the current publishers. The desired result is the set difference between the last known publishers and the current publishers.

2. The new publishers. This is the set of publishers new to the subscribing node's subscription list since the last time that the two nodes were mutually reachable. The desired result is the set difference between the current publishers and the last known publishers.

3. The retained publishers. This is the set of publishers present in the subscribing node's subscription list before and after the outage. This is the set intersection of the current publishers and the last known publishers.

Each publisher in the set of forgotten publishers is treated as though it were the target of a separate node-service-handle-unsubscribe message for the purpose of updating the associated subscription conversation and second-tier maps. Likewise each publisher in the set of new publishers is treated as though it were the target of a separate node-service-handle-subscribe message for the same purposes. Each publisher in the set of retained publishers is treated as though it were the target of a separate redundant node-service-handle-subscribe message, so only the associated subscription conversation is updated. In addition, all appropriate node-service-handle-notification messages are constructed and sent, observing the service reestablishment grace period as necessary.

The effect of receiving a sequence of second-tier subscription control messages is independent of the order in which they were received, which is an essential aspect of the subscription mechanism and allows for reliable notification of changes to the states of publishers. The two-tier mechanism can reduce network traffic compared to a one-tier mechanism and can reduce notification latency. In particular, when the nodes hosting the network transport software are deployed in a large grid-like mesh, the subscription architecture scales at least to millions of service handles variously subscribed to hundreds or thousands of publishers.

Figure 9:
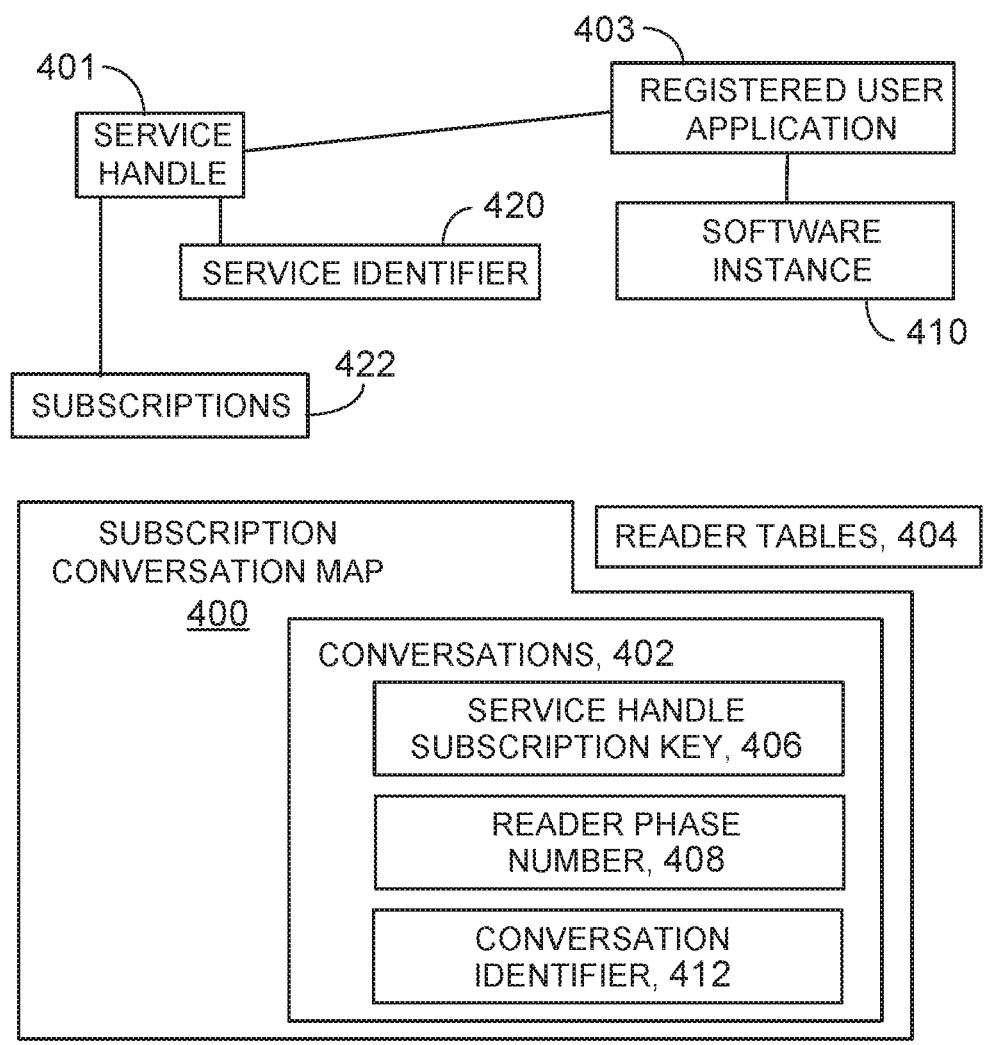

The network transport software subscription conversation map does not discard any conversations. In some implementations, most service handles are dynamically allocated to meet the communication requirements of user applications. Such service handles are therefore only viable publishers during their limited lifetime; once closed, they generally are not expected to become open again. Under these circumstances, the network transport software subscription conversation map 400 (FIG. 9) will accumulate conversations about permanently defunct service handles.

In some implementations, to prevent unbounded memory growth due to the accumulated conversations, a reaper task 404 executes periodically at a configurable interval. By default, the reaper period is three hours. When the reaper task executes, it collects every conversation that satisfies at least the criteria that 1) no subscription is extant for its network transport software service handle subscription key 406 and 2) its reaper phase number 408 is less than the current reaper phase number. Then the reaper task transactionally removes all such conversations from the conversation map. Finally the reaper task also increments the reaper phase number. In some implementations, the relatively long default reaper period is sufficient to maintain a 1 GB heap limit for the large-scale deployment scenario described above.

At any time after a service handle 401 becomes open, its registered user application 403 may relinquish ownership by sending its network transport software instance 410 a close-service-handle message that contains a new conversation identifier 412 and the service handle. Processing of this message by the network transport software causes the service handle to be deregistered, thereby causing the service handle to enter the closed state. Any service identifiers 420 and subscriptions 422 associated with the service handle are then forgotten as if appropriate unbind-service-identifier and service-handle-unsubscribe messages were applied. Client datagrams that arrive at closed service handles are discarded at the destination network transport software. Once the message is fully processed, the network transport software replies with a client-acknowledgment message that includes the request's conversation identifier and an acknowledgment code of ok. If a user application suddenly disconnects from its network transport software, then the network transport software automatically closes all open service handles registered to the user application. This happens as if the user application had first sent a close-service-handle message for each of its open service handles.

In some situations, the network transport software may not be able to successfully process the control messages. Upon receipt of any control message, the network transport software checks the message against its internal state before deciding to allow the corresponding operation to proceed. For instance, a user application cannot open a service handle already registered as open, either by itself or by another user application. Likewise a user application cannot close a service handle registered as open by another user application. These error conditions may imply a nonsensical operation, like closing an already closed service handle, or violation of privilege, like disestablishing a service binding for a service handle owned by a different user application than the requestor. Such operations produce client-acknowledgement messages whose acknowledgment codes differ from ok. In some implementations, the client checks the resultant acknowledgment code to proceed accordingly and makes no assumption that the process of the control messages is successful.

Figure 10:
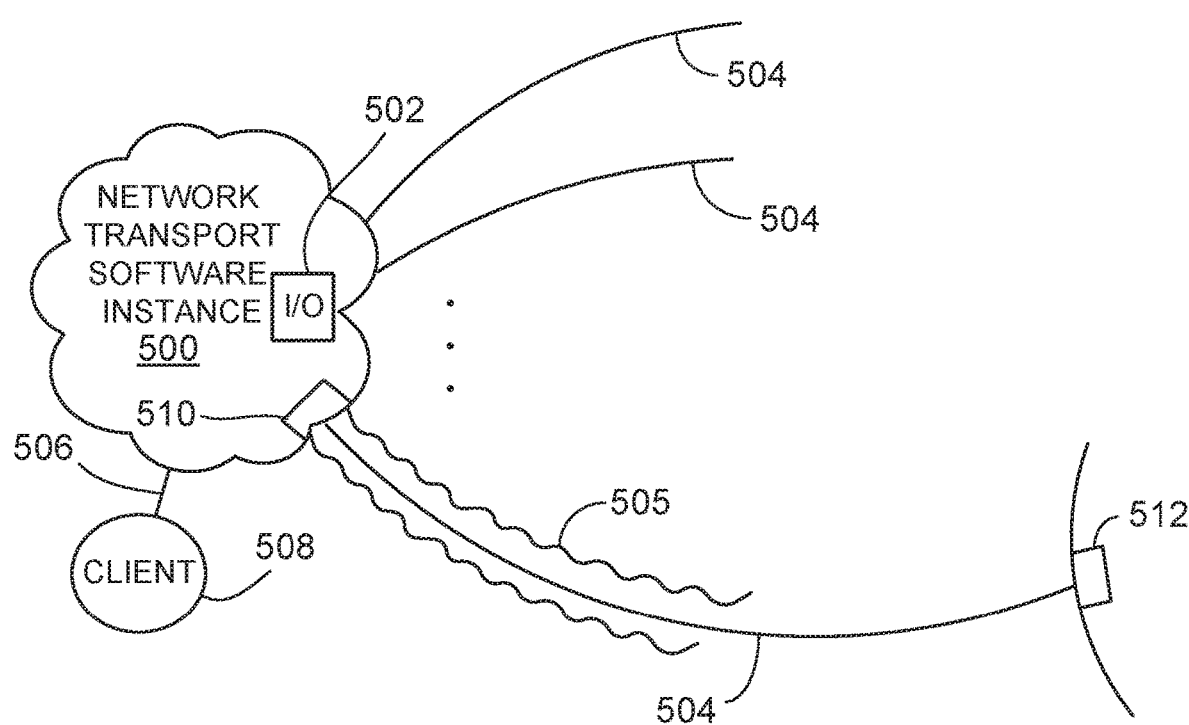

We now consider the operation of the input/output (I/O) system 502 (FIG. 10) of the network transport software 500. In some implementations, the node's I/O subsystem scales to hundreds of threads managing tens of thousands of simultaneous TCP connections. The theoretical limits are higher, except that the node's connectivity is bounded by the limitations of the TCP. No more than $2^{16}$ TCP connections may exist between a node and its external neighbors and internal clients. This is the design limit imposed by TCP, and corresponds to the complete space of TCP port numbers. The practical limit may be lower, when other processes running on the node also consume TCP port numbers.

The network transport software overcomes these limitations by providing virtual channels 504, many of which may multiplex data over a single shared TCP connection 505. In some implementations, exactly one TCP mesh connection 505 exists between any two neighboring nodes and exactly one application connection 506 exists between a node and a client 508. In some implementations, all network traffic between these parties must flow across these singular TCP connections. Each service handle that a client registers establishes a live communication endpoint; there can be a very large number of service handles that a particular client registers. Every other service handle is a potential communication endpoint. Any two service handles can define a channel 504, and any two open service handles 510 512 define a live channel. A node's internal data structures scale to managing millions of open service handles scattered across myriad clients.

The scalability and other advantages of channels is illustrated using the following example. Let M(N) be the local network transport software instance for a client N. Let S(N) be the set of service handles registered to a client N. Given two clients A and B, assume that exactly one application connection exists between A and M(A), likewise for B and M(B), and exactly one TCP mesh connection exists between M(A) and M(B). Then only 3 TCP connections are necessary to support the Cartesian product S(A)×S(B). Given that each of S(A) and S(B) may be a set containing 1 million open service handles, the number of live connections may exceed 1 trillion. Channels provide an enormous scalability advantage over dedicated TCP connections.

To enable the network transport software to scale to arbitrarily large deployment scenarios, its I/O mechanisms need to operate correctly, independent of network load. Scalable I/O algorithms exhibit performance inversely proportional to traffic volume and correctness invariant with respect to traffic volume. Scalable systems may be subject to deadlock condition.

An important aspect of at least some implementations of the network transport software's I/O subsystem is freedom from deadlock at all scales. This freedom is both theoretical and practical. In some implementations, to obtain freedom from deadlock, at least the following criteria are set to be met: 1) all I/O operations provided through system calls are asynchronous and 2) entry conditions to critical sections that protect internal data structures do not block the executing thread for arbitrary amounts of time. In some implementations, to satisfy 2), threads awaiting access to a critical section need to be scheduled fairly.

The network transport software satisfies the first condition by using only platform I/O APIs that are asynchronous. All reads from TCP connections, writes to TCP connections, initiations of new TCP connections, and establishments of TCP connections are performed asynchronously, consuming resources only when the operation may be completed without blocking the executing thread indefinitely. In particular, in some implementations, only asynchronous DNS resolution is used when initiating new connections. Platform APIs for DNS resolution are classically synchronous, especially on UNIX® variants and derivatives. In some implementations, the network transport software nonetheless avoids synchronous DNS resolution in all circumstances and for all supported platforms, through use of asynchronous custom APIs.

Satisfaction of the second condition uses architectural support, as follows.

Figure 11:
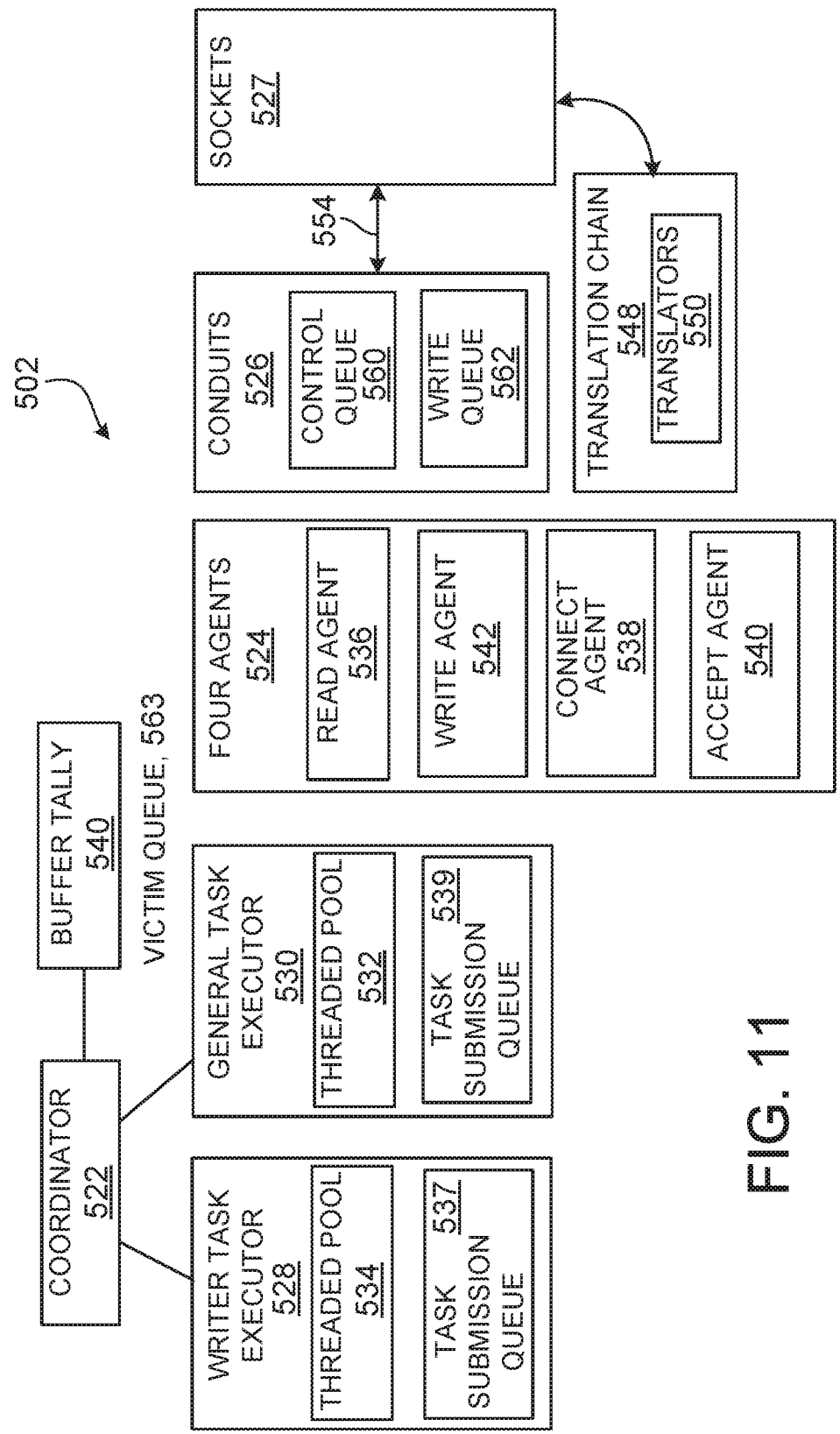

As shown in FIG. 11, in some implementations, the network transport software's I/O subsystem 502 comprises at least three types of entities: a single coordinator 522 with the responsibility for managing threads and buffering reified and serialized messages; one or more, e.g., four, agents 524, each of which manages a different kind of TCP I/O event; and one or more, e.g., many, conduits 526, each of which enriches a single socket-based TCP connection 505.

The coordinator provides two task executors, each of which is backed by a different pool of threads. The writer task executor 528 is reserved for executing tasks whose exclusive function is to write a single serialized message to a socket. The general task executor 530 is available for executing all other tasks, but is principally used for executing tasks whose exclusive functions, respectively, are to read a single serialized message from a socket or to complete an asynchronous TCP connection. The segregation of the two task executors improves performance by reducing contention between writes and other activities, notably reads, but is not necessary for algorithmic correctness. Empirical evidence shows that this division of labor leads to improved throughput, and that this improvement is sufficient to warrant the increased complexity.

A thread that wishes to take advantage of one of these thread pools 532, 534 does so by submitting a task to the corresponding task executor's unbounded task submission queue 537, 539. Whenever a task executor has idle threads, it dequeues the task at the head of the task submission queue and arranges for an idle thread to execute it. Task execution is therefore asynchronous with respect to task submission. The primary clients of the task executors are the four agents.

The coordinator also tracks the aggregate memory utilization of all messages pending for transmission and enforces a buffer threshold. The buffer threshold is a configurable parameter and represents the approximate number of bytes that the node will buffer. The buffer tally 540 is the coordinator's reckoning of the number of bytes currently buffered. The size of a message is its complete memory footprint, including "invisible" system overhead such as its object header. Every message also knows the size of its serialized form. For the purpose of accounting for aggregate memory utilization, the coordinator treats a message as if its intrinsic representational requirement were the greater of the two footprints. This both simplifies and expedites the accounting.

There are four agents, one for each basic kind of TCP event. The read agent 536 manages asynchronous reads. When the operating system's TCP implementation indicates that data has arrived for a particular socket 527, the read agent enqueues on the general task executor a task that, when performed, will read as many bytes as are available from the associated network buffer and append them to a message assembly buffer owned by the conduit responsible for the socket. A particular read may not culminate in the ability to reify a complete message from the message assembly buffer. The serialized forms of messages have sufficient internal structure to allow efficient stepwise storage and assembly. When a read results in the assembly and reification of a complete message, it is processed synchronously.

The connect agent 538 and the accept agent 540 are respectively responsible for establishing outgoing and incoming TCP connections. When the operating system indicates that a connection has been completed, the appropriate agent enqueues on the general task executor a task that, when performed, will create and configure a conduit that abstracts the new socket. Any action that has been deferred until connection establishment completes is performed synchronously.

The write agent 542 manages asynchronous writes. When the operating system indicates that data may be written to a particular socket, the write agent enqueues on the writer task executor a task that, when performed, will cause the conduit responsible for the socket to serialize and transmit as many pending messages as allowed by the current transmission window availability. A particular write may not culminate in transmission of a complete message. Generally, a conduit completes transmission of a partially transmitted message before serializing and transmitting additional messages.

The network transport software communicates with neighbors and clients using conduits. A conduit 526 encapsulates a socket 527 and abstracts 551 access to it. The conduit offers asynchronous read and write capabilities in a fashion that permits its clients to exert fine-grained control over the serialization of messages. A client obtains a conduit by asking the coordinator to initiate or accept a TCP connection. When the TCP connection is established asynchronously with respect to the connection initiation, the client specifies a configuration action that will be performed upon establishment of a TCP connection.

In use, the configuration action binds a translation chain to the conduit. A translation chain 548 comprises an ordered sequence of modular, pluggable translators 550. A translator serves to migrate bidirectionally between serial representations of messages. A translator has a write converter and a read converter. Each converter accepts as input a buffer of data and produces as output a buffer of data. The write converter accepts a buffer of data flowing toward a socket; the read converter accepts a buffer of data flowing from a socket. A translation chain may be applied in the write direction, and the translation chain then accepts a reified message and passes it, in the client-specified order, through the write converters of its translators to produce the final serial form that will be written to its conduit's socket. Conversely, when a translation chain is applied in the read direction, it accepts the final serial form from the conduit's socket, applies the read converters of its translators in the opposite order, and produces a reified message.

Translation chains may be used for various purposes, e.g., enforcing protocol requirements, compressing streams, encrypting streams, etc. Translators may be stateful, thereby allowing the translation chain to alter the transactional boundaries of messages; the smallest translation quantum may contain several protocol messages.

The configuration action also associates a read action with the conduit. This action is performed when the conduit's translation chain produces reified messages. This action is executed asynchronously with the configuration action and synchronously with the actual read of data from the socket's network read buffer. The action runs in a thread managed by the general task executor. To allow the network transport software to be free of deadlocks, the read action does not perform any operations that could block for an arbitrary amount of time. This constraint applies specifically to direct I/O operations. A read action may, however, enqueue a message for transmission on any conduit without fear of deadlock. Whenever a conduit is informed that data has been received on its socket, it passes this data through its translation chain in the read direction. Once sufficient data has percolated through the translation chain so that one or more reified messages are available, the read action is performed for each of them, one at a time, in order.

A client may write a message to a conduit. In some implementations, this is permissible at any time and in any context. A message written to a conduit is not immediately serialized and transmitted using the underlying socket. First it is assigned a message number from a monotonically increasing counter. It is then enqueued upon one of the conduit's two transmission queues: the control queue 560, reserved for high-priority control messages like open-service-handle and bind-service-identifier; and the write queue 562, used for client-datagram messages and low-priority control messages like liveness. A conduit informs the coordinator of any write to either queue, thereby allowing the coordinator to increment the buffer tally by the size of the newly enqueued message. The network transport software guarantees that messages enqueued on a conduit's control queue will eventually be serialized and transmitted.

Messages enqueued on a conduit's write queue may be discarded if a write to the conduit causes the buffer tally to exceed the buffer threshold. The coordinator maintains a priority queue of conduits, called the victim queue 563, ordered by the message number of the oldest message enqueued on the write queue of each conduit. In some implementations, a conduit appears in this priority queue if and only if it has one or more messages enqueued on its write queue. When a write to a conduit causes the buffer tally to exceed the buffer threshold, the coordinator discards messages until the buffer tally no longer exceeds the buffer threshold.

In particular, the coordinator removes the head of the victim queue, removes and discards the head of its write queue, decrements the buffer tally by the size of the discarded message, reinserts the conduit into the victim queue, and repeats the process until the buffer tally is less than the buffer threshold. The slowest flowing conduits are penalized first, thereby allowing traffic along other conduits to continue to make progress. In some implementations, the network transport software clients employ a higher-level stream protocol 29 to communicate with one another, and the messages that are retransmitted soonest are discarded.

In some cases, it is conceivable that only high-priority control messages are enqueued on conduits, but the buffer tally somehow exceeds the buffer threshold due to a large volume of control messages. In such cases, the coordinator can continue to buffer messages indefinitely and without respecting the buffer threshold.

When a conduit becomes eligible to write data to its socket, it first transmits as much as possible of the current fully translated buffer. If the conduit successfully consumes and transmits this buffer, which may already be empty in a trivial case, then it dequeues a message. If there are messages enqueued on the conduit's control queue, then the oldest of the enqueued messages is dequeued; otherwise the conduit dequeues the oldest message on the write queue. In this way, the algorithm prefers to serialize and send high-priority control messages. Not only are such messages more likely to exhibit time sensitivity in their processing, but they exert higher pressure on the network transport software because the mesh cannot freely discard them even under heavy load.

Having dequeued a message, the conduit instructs the coordinator to decrement its buffer tally by the size of the message. Then the conduit passes the message through the translation chain in the write direction to produce a serialized buffer. If no buffer is produced, then the conduit orders the translation chain to flush. If no buffer is produced, then the conduit aborts the transmission process and awaits the enqueuing of new messages. Assume that a buffer has been obtained. The conduit instructs the coordinator to increment its buffer tally by the size of the buffer, possibly causing old messages enqueued on the write queues of one or more conduits to be discarded. Then the conduit transmits as much of the produced buffer as the socket's transmission window availability allows and decrements the buffer tally appropriately.

In some implementations, each conduit, agent, and coordinator is outfitted with a reentrant lock that controls access to its data structures. Use of conduits can drive lock acquisition. For example, a thread that wishes to acquire the locks for a particular trio of <conduit, coordinator, agent> acquires the locks in the order specified in the tuple to avoid the possibility of deadlock. The network transport software implements, e.g., strictly implements, the locking order, e.g., using techniques to ensure the correctness of the implementation and to detect aberration from the correct locking order as early as possible. In some implementations, the acquired locks are owned by the conduits for short periods of time, e.g., less than 1 ms, allowing for high throughput.

With respect to starting, stopping, and restarting, the network transport software has been designed to be highly configurable and provides mechanisms for setting configurable parameters. For example, to support various deployment scenarios, these parameters may be specified using 1) the platform-specific command line, 2) an XML configuration document whose outermost element is <configuration>, or 3) Java system properties, or some combination of two or more of those. If a particular parameter is multiply specified through these mechanisms, the network transport software will not start until all values given for the parameters match semantically. Otherwise, the network transport software issues an error message that describes the detected incoherence to allow an end user to review the settings of the running network transport software in a straightforward fashion. The end user does not have to memorize rules of precedence of configuration sources and can use information obtained from the error message to determine the actual runtime values of parameters whose sources disagree.

In some implementations, only a few configuration parameters are made available through command-line options. These include the most common and important options. They serve as useful semantic documentation for an end user who examines the node's running processes through a platform-specific application or utility, such as Windows Task Manager (Microsoft Windows®), Activity Monitor (Mac OS X®), and ps or top (UNIX® variants), that features a mode to display an application's command line.

Examples of the complete set of configurable parameters are as follows. Some configuration patterns are described by regular expressions, particularly to explain optional or repeating elements.

network transport software identifier. The instance's network transport software identifier can include the following parameters.
        Command line: --myId=(host:)?port
        XML element: <myId>(host:)?port</myId>
        System property: com.miosoft.mioplexer.myId=(host:)?port
        Default: <autodetected DNS hostname, 13697>
        host is the DNS hostname of the node and port is an available TCP port number in the range [0, 65535]. host is optional and defaults to the autodetected hostname. It can be determined by querying the operating system, if not specified. If this autodetection procedure fails to ascertain a unique hostname for the node, then the hostname "localhost" is chosen. Failure to correctly establish the network transport software identifier may result in the unreachability of the instance.

Greeter port number. The instance's greeter port number can include the following parameters. This is the UDP port number used by the network transport software autodiscovery reflex.
        Command line: --greeterPort=port
        XML element: <greeterPort>port</greeterPort>
        System property: com.miosoft.mioplexer.greeting.greeterPort=port
        Default: network transport software identifier's TCP port number
        Port is an available UDP port number in the range [0, 65535]. Failure to correctly establish the greeter port number may result in the instance's inability to participate in the network transport software autodiscovery mechanism.

Greeter targets. The autodiscovery process will attempt to contact the complete set of <DNS hostname, UDP port number>. It may be necessary to specify these explicitly to ensure that nodes separated by firewalls can communicate.
        Command line: --greeterTargets=(host:)?port (,(host:)?port)*
        XML element: <greeterTargets>(<greeterTarget>(host:)?port</greeterTarget>)*</greeterTargets>
        System property: com.miosoft.mioplexer.greeting.greeterTargets=(host:)?port(,(host:)?port)*
        Default: The set of all pairs <broadcast address, greater port number>, where broadcast address is the broadcast address of one of the node's network adapters.
        host is a DNS hostname of the node and port is a TCP port number in the range [0, 65535]. host is optional and defaults to the autodetected hostname. It can be determined by querying the operating system, if not specified. If this autodetection procedure fails to ascertain a unique hostname for the node, then the hostname "localhost" is chosen. Failure to correctly establish this list may result in an unexpected and unusual mesh topology.

Greeter heartbeat. The greeter heartbeat is the denominator of the frequency with which the network transport software transmits request-greetings messages to all greeter targets. The parameters are specified in milliseconds.
        XML element: <greeterHeartbeatMillis>rate<greeterHeartbeatMillis>
        System property: com.miosoft.mioplexer.greeting.greeterHeartbeatMillis=rate
        The network transport software will send a request-greetings message to all greeter targets with a frequency of once per rate milliseconds.

Liveness probe rate. This rate is the inverse of the frequency with which liveness messages are sent across established TCP connections. The parameters are specified in milliseconds.
        XML element: <livenessProbeRateMillis>rate</livenessProbeRateMillis>

System property: com.miosoft.mioplexer.routing.liveness-ProbeRateMillis=rate

Default: 30,000

The network transport software will send liveness messages to each established TCP connection, whether client or neighbor, with a frequency of once per rate milliseconds. The liveness probe rate can be set low to reduce network traffic or high to quickly detect faults on low-traffic connections.

Routing postponement quantum. The quantum postpones routing tasks, such as routing table construction and neighborhood snapshot propagation. The parameters are specified in milliseconds. This quantum is renewed when an update occurs that would cause a delayed computation to produce a different answer. This allows incremental lengthening of delays.

XML element: <routingPostponementMillis>quantum</routingPostponement Millis>

System property: com.miosoft.mioplexer.routing.postpone-mentMillis=quantum

Default: 5

Quantum is the amount of time, in milliseconds, to delay a routing task. Failure to set the routing postponement quantum wisely may result in poor performance.

Retransmission rate. The denominator of the frequency with which inter-network transport software control messages are retransmitted. The parameters are specified in milliseconds.

XML element: <retransmissionRateMillis>rate</retransmissionRateMillis>

System property: com.miosoft.mioplexer.services.retrans-missionRateMillis=rate

Default: 5,000

The network transport software will retransmit a message on the retransmission list with a frequency of once per rate milliseconds. Failure to set the retransmission rate wisely will result in increased network traffic or increased latency for service requests.

Service reestablishment grace period. This period is the amount of time must elapse after the network transport software on a node starts before the network transport software should send a service-handle-notification or node-service-handle-notification message that reports a closed service handle state. Specified in milliseconds.

XML element: <gracePeriodMillis>quantum</gracePeriodMillis>

System property: com.miosoft.mioplexer.services.gracePer-iodMillis=quantum

Default: 30,000

The network transport software will delay transmission of affected notifications by quantum milliseconds. Failure to set the service reestablishment grace period wisely will result in increased interruptions in communication or increased latency when the network transport software instances cycle.

Registrar postponement quantum. The quantum is related to postponement of registrar tasks, such as service catalog snapshot propagation. The parameters are specified in milliseconds. This quantum is renewed when an update occurs that would cause a delayed computation to produce a different answer. This allows incremental lengthening of delays.

XML element: <registrarPostponementMillis>quantum</registrarPostponementMillis>

System property: com.miosoft.mioplexer.services.postponementMillis=quantum

Default: 5

Quantum is the amount of time, in milliseconds, to delay a registrar task. Failure to set the routing postponement quantum wisely may result in poor performance.

Reaper period. This period is the inverse of the frequency with which the reaper task executes. The parameter is specified in milliseconds.

XML element: <reaperPeriodMillis>rate</reaperPeriodMillis>

System property: com.miosoft.mioplexer.services.reaperPeriodMillis=rate

Default: 10,800,000

The reaper task will execute with a frequency of once per rate milliseconds. The reaper period can be set to prevent regression of second-tier subscription conversations or excessive memory growth.

Buffer threshold. The threshold sets the approximate number of bytes that the network transport software buffers before discarding eligible messages. A single message or buffer may cross this threshold, and by an arbitrary amount. The parameter is specified in bytes.

Command line: --bufferThreshold=threshold

XML element: <bufferThreshold>threshold <bufferThreshold>

Default: 200,000,000

The network transport software will buffer threshold bytes of messages and buffers, plus a single message or buffer. Failure to set the buffer threshold wisely may result in poor performance.

Thread pool size. This size specifies the maximum number of threads that will be allocated to each of the network transport software's thread pools.

XML element: <threadPoolSize>size</threadPoolSize>

Default: Twice the number of processor cores.

The network transport software will populate each thread pool with at most this many operating system kernel schedulable threads. Failure to set the thread pool size wisely may result in poor performance.

During startup, the network transport software writes an informative herald to its standard output, if any. This herald can include the build version, the preferred server protocol version, the supported server protocol versions, the supported client protocol versions, a detailed timestamp closely correlated to the herald's generation, and a copyright notice. An end user with access to this herald can readily determine many important facts of the sort required by developers and support staff when troubleshooting problems.

The network transport software is designed and implemented without special shutdown requirements. An end user with logical access to a network transport software's process may use the platform's tools to terminate the process. The network transport software does not require a clean shutdown procedure, so this is an acceptable means of stopping an instance. A node can completely shut down or crash without any exceptional consequences for other nodes participating in the mesh or for the instance's replacement incarnation.

In many environments, a mesh administrator may not have access to all nodes or instances' processes participating in the mesh. To practically perform administration of the entire mesh, the mesh administrator may use an administrative client to stop or restart the network transport software on a node. To stop the network transport software, the client sends a request-shutdown message to its local network transport software. This message encapsulates a new conversation identifier, the network transport software identifier of the target network transport software, the amount of time (in milliseconds) that the target should delay prior to exiting, and the status code with which the operating system process should exit.

When a node receives a request-shutdown message, it creates a routable shutdown message and reliably transmits it to the destination using the same mechanism as described for the second-tier subscription control messages. This message contains the same destination network transport software identifier, timeout, and status code, plus its own network transport software identifier and a new conversation identifier. Only upon receipt of a node-acknowledgment message containing this conversation identifier does the network transport software acknowledge the originating client by means of a client-acknowledgment message that contains the original conversation identifier and an acknowledgment code of ok.

When the network transport software receives a shutdown message, it immediately replies with a node-acknowledgment message that contains the same conversation identifier and an acknowledgment code of ok. It then delays for the specified amount of time. Finally the network transport software exits the operating system process with the carried status code.

To restart the network transport software on a node, the client sends a request-restart message to its local node. This message encapsulates a new conversation identifier, the network transport software identifier of the target network transport software, the amount of time (in milliseconds) that the target should delay prior to restarting, and an optional replacement network transport software binary.

When a node receives a request-restart message, it creates a routable restart message and reliably transmits it to the destination. This message contains the same destination network transport software identifier, timeout, and replacement binary, plus its own network transport software identifier and a new conversation identifier. When it finally receives a node-acknowledgment message that contains this conversation identifier, it replies to the client with a client-acknowledgment message that contains the original conversation identifier and an acknowledgment code of ok.

When the network transport software receives a restart message, it immediately replies with a node-acknowledgment message that contains the same conversation identifier and an acknowledgment code of ok. It then delays for the specified quantum. Once the quantum expires, the network transport software prepares to restart. If no replacement network transport software binary has been specified, the network transport software starts a special network transport software relauncher application and exits. The network transport software relauncher delays until its parent process has terminated. It then launches the network transport software and finally exits.

If a replacement network transport software binary has been specified, then the network transport software instance securely writes it to a temporary file. The network transport software instance then starts the network transport software relauncher, specifying the location of the replacement network transport software binary. The network transport software now exits. The network transport software relauncher delays until its parent process has terminated. It then overwrites the original network transport software binary with the contents of the temporary file. Finally it launches the new network transport software binary and exits. The network transport software and the relauncher are bundled together in the binary, so the relauncher itself is simultaneously updated and semantic compatibility between the two applications is provided. Facilitated by a good administrative client, a mesh administrator may thus effect an easy upgrade of a single node or an entire mesh.

It is possible that a node-acknowledgment message that is a reply to either a shutdown or restart message may be lost in transit. When the target node becomes unreachable from the client's network transport software as a consequence of having quit, the client's network transport software cancels the retransmission task responsible for reliably sending the shutdown or restart message. Without this precaution, newly started network transport software on a node might receive a shutdown or restart message that was intended for its previous instance and inappropriately exit. This error could cascade through many iterations of instances so long as the race condition continued to resolve itself in the same fashion.

With respect to user access, diagnostics, and logging, the network transport software runs essentially as a daemon process. Though the process may control a terminal session, for example, when starting the network transport software from the platform command line, this process does not supply input to the program. Such a session is used to display information to the user, such as the herald, high-priority informational messages, and stack traces that result when noteworthy exceptional conditions occur.

Some implementations use the Java Logging API that is provided with the Java Runtime Environment (JRE) to provide end-user customizable logging. This framework allows an end user with logical access to the network transport software on a node using the shell or desktop to decide which avenues (terminal, file system, socket, etc.) to use and how to filter messages by their intrinsic priorities. In some implementations, the following Java system properties may be used to set the logging priority filters for the various network transport software subsystems:

com.miosoft.io.Coordinator.level. This sets the verbosity of the I/O and buffer management subsystem. This can be very noisy when the logging priority filter is set lower than the recommended value, as it provides copious debugging information related to connection maintenance and message traffic. Generation and output of this additional information may degrade performance. The recommended value is INFO.

com.miosoft.mioplexer.Mioplexer.level. This determines whether forged or unrecognized messages will be logged. The recommended value is WARNING.

commiosoft.mioplexer.MioplexerConfiguration.level. This sets the verbosity of the configuration processor. As such, it provides notifications about configurable parameters, such as their final values and problems encountered when attempting to parse them or obtain defaults. The recommended value is WARNING.

com.miosoft.mioplexer.greeting.Greeter.level. This sets the verbosity of the autodiscovery reflex. This can be somewhat noisy when the logging priority filter is set very low, as it provides debugging information about transmission of request-greetings and greetings messages. The recommended value is WARNING.

com.miosoft.mioplexer.routing.Router.level. This sets the verbosity of the router. This can be periodically noisy, particularly when the mesh is experiencing flux, but generally is quiet. The recommended value is INFO; it strikes a good balance between performance and reporting.

com.miosoft.mioplexer.services.Registrar.level. This sets the verbosity of the registrar. This can be periodically noisy, particularly when the mesh is experiencing a surge of client activity, but generally is quiet. The recommended value is INFO. Based on this setting, the most interesting messages, such as open-service-handle, close-service-handle, request-restart, and request-shutdown, are logged upon receipt.

Logs enable a mesh administrator to passively monitor mesh health and perform post hoc investigation. Sometimes it is valuable to run live queries against a running system. For example, a client that wishes to examine the internal state of a running network transport software instance may send a request-diagnostics message tailored to its particular interest set. This message includes a new conversation identifier, the network transport software identifier of the destination node, and a set of diagnostic request identifiers. Each diagnostic request identifier uniquely specifies a particular type of diagnostic information, and the set in aggregate is understood to represent a transactionally complete interest set.

When the network transport software of a node receives a request-diagnostics message, it sends a node-request-diagnostics message to the destination network transport software. This message includes a new conversation identifier, the network transport software identifier of its creator, and the same set of diagnostic request identifiers. The network transport software transmits it reliably using the same mechanism as for second-tier subscription control messages and shutdown and restart messages.

When a node receives a node-request-diagnostics message, it examines the set of diagnostic request identifiers and computes the appropriate diagnostic information. The kinds of diagnostics that could be provided conceptually are quite broad. In some implementations, only a handful are specified and implemented at the time of writing. These are:

- Build version. This is the current build version of the target network transport software. This assists mesh administrators in keeping all software current.
- Neighborhood. This is the current neighborhood of the target network transport software, specified as a set of network transport software identifiers.
- Reachable network transport software instances. This is the complete set of nodes reachable from the target network transport software. In a healthy environment, this should converge, once the mesh stabilizes, to the complete set of nodes participating in the mesh.
- Neighborhood pairs. This is the complete set of neighborhood pairs <source, neighbor> known to the target network transport software, where source is the network transport software identifier of the node that originated the neighborhood snapshot that attested the relationship and neighbor is the network transport software identifier of a neighbor in the source node's neighborhood.
- Routing pairs. This is the complete set of routing pairs <target, next hop> known to the target network transport software, where target is the network transport software identifier of a reachable node and next hop is the network transport software identifier of the node to which traffic should be routed in order to reach the target network transport software.
- Local service catalog. These are the local service offerings of the target network transport software, specified as a set of service bindings.
- Service catalog. This is the complete set of service offerings known to the target network transport software, specified as a set of service bindings.
- Open service handles. This is the complete set of open service handles registered to clients of the target network transport software.
- Active service handle subscription pairs. This is the complete set of active service handle subscription pairs <subscriber, publisher>, where subscriber is an open service handle registered to a client of the target network transport software and publisher is any publisher, local or remote.
- Active routing subscriptions. This is the complete set of routing subscriptions, specified as a set of open service handles registered to clients of the target network transport software.

In some implementations, the network transport software will be able to provide support for more varied diagnostics. In particular, the network transport software may be able to report the values of all configurable parameters. In addition, the network transport software may be able to report information about its node, like CPU, disk, and network activity levels. Once all diagnostics have been computed, the network transport software packages them into a diagnostics message with a conversation identifier that matches the one carried inside the node-request-diagnostics message. The diagnostics message also includes a timestatnp that corresponds closely to the time of its reification. When the client's attached network transport software receives the diagnostics message, it removes the copied node-request-diagnostics message from the retransmission list in order to prevent redundant delivery of diagnostic information to the client (as a result of an incoming diagnostics message racing with a slow outgoing node-request-diagnostics message). The network transport software then extracts the diagnostics and timestamp and creates a new diagnostics message that encloses this information and the client's original conversation identifier. Finally it delivers the diagnostics message to the client.

With respect to acknowledgment codes, when a client sends its connected network transport software instance a service control message, such as an open-service-handle message or a close-service-handle message, the network transport software replies with a client-acknowledgment message. When a node sends another node a second-tier subscription control message, the remote node replies reliably with a node-acknowledgment message. Both kinds of acknowledgment message include an acknowledgment code that describes the result of attempting the specified operation. Since requested operations usually are completed without error, this acknowledgment code will typically be ok. Other acknowledgment codes are possible, and sometimes are the result of poor client behavior.

Examples of acknowledgment codes are listed below. The parenthetical value is the numeric representation of the acknowledgment code, as appearing for instance in a serialized acknowledgment message. The indented lists are the messages that may elicit responses that convey the acknowledgment code.

- ok (0). The network transport software satisfied the specified request without encountering any exceptional circumstances. Applicable when receiving messages:
  open-service-handle
  close-service-handle
  bind-service-identifier
  unbind-service-identifier
  service-handle-subscribe service-handle-unsubscribe
node-service-handle-subscribe
node-service-handle-unsubscribe
node-request-service-handle-notifications
routing-subscribe
routing-unsubscribe
request-restart
request-shutdown
restart
shutdown error_service_handle_allocated_by_another_node (−1). The node refused to satisfy the request because the target service handle was allocated by a different node.
open-service-handle error_service_handle_registered_to_another_client (−2). The node refused to satisfy the request because the target service handle is registered to a different client.
open-service-handle
close-service-handle
bind-service-identifier
unbind-service-identifier
service-handle-subscribe
service-handle-unsubscribe
routing-subscribe
routing-unsubscribe error_service_handle_already_open (−3). The node refused to satisfy the request because the target service handle is already open.
open-service-handle error_service_handle_not_open (−4). The node refused to satisfy the request because the target service handle is not open.
close-service-handle
bind-service-identifier
unbind-service-identifier
service-handle-subscribe
service-handle-unsubscribe
routing-subscribe
routing-unsubscribe error_service_binding_already_established (−5). The node refused to satisfy the request because the target service binding is already established.
bind-service-identifier error_service_binding_not_established (−6). The node refused to satisfy the request because the target service binding is not established.
unbind-service-identifier error_service_handle_already_subscribed (−7). The node refused to satisfy the request because the target subscription already exists.
service-handle-subscribe
routing-subscribe error_service_handle_not_subscribed (−8). The node refused to satisfy the request because the target service handle subscription does not exist.
service-handle-unsubscribe
routing-un subscribe error_special_service_handle (−9). The node refused to satisfy the request because an embedded service handle contains a UUID that falls within the range reserved for internal use. This range is [0x00000000000000000-00000000000000000, 0x00000000000000000000000-00000003E8], i.e. the first 1,000 sequential UUIDs.
open-service-handle
service-handle-subscribe In some implementations, the acknowledgment codes delivered inside client-acknowledgment messages need to be checked to ensure correctness of algorithms and reasonable programming practices should be used.

The techniques described here can be used in a wide range of fields and in a wide range of applications, for example, applications or networks that require a very large number of communication paths among applications running on nodes of a network or a relatively low amount of overhead devoted to establishing and maintaining communication paths in a network or both.

The techniques described here can be implemented on a wide variety of commercially available platforms in the fields of computer hardware, routers, gateways, wiring, optical fiber, and other networking hardware, operating systems, application software, firmware, networking, wireless communication, user interfaces, and others.

Other implementations are within the scope of the following claims.

The invention claimed is:

1. A method comprising
in a node of a communication network, enabling maintenance of communication endpoints for use in establishing conversations of the nodes and of the applications of the network, the endpoints being maintained persistently as one or more of the following occur: (a) conversations are established and terminated, (b) network transport software instances are shut down and restarted, (c) nodes on which network transport software instances are running are shut down and restarted, (d) an entire network transport layer mesh is shut down and restarted, or (e) the entire communication network is shut down and restarted,
wherein maintaining the endpoints persistently comprises maintaining associated service handles persistently, the corresponding service handles on each endpoint of a pair of endpoints defining a channel between the pair of endpoints.

2. The method of claim 1 comprising applying security techniques based on the persistence of the endpoints.

3. The method of claim 1 comprising maintaining statistically unique global identity of the service handles.

4. The method of claim 3 comprising enabling service handles to be reused by transport software instances to represent given participants of a conversation.

5. The method of claim 1 comprising enabling applications on nodes of the communication network to provide and use services between them privately based on the persistence of the endpoints.

6. The method of claim 1 comprising migrating applications from one node to another node of the network and enabling the migrated applications to provide and use services to one another based on the persistence of the endpoints.

7. The method of claim 1 comprising analyzing static program correctness based on the persistence of the endpoints.

8. The method of claim 1 comprising re-establishing conversations of the nodes after a failure of the communication network based on the persistence of the endpoints.

* * * * *